(12) United States Patent
Ikeda et al.

(10) Patent No.: US 9,068,098 B2
(45) Date of Patent: Jun. 30, 2015

(54) WATER PRESSURE TRANSFER METHOD, COATING AGENT FOR WATER PRESSURE TRANSFER FILM, AND WATER PRESSURE TRANSFER ARTICLE

(75) Inventors: Wataru Ikeda, Tokyo (JP); Akiko Tomiki, Tokyo (JP)

(73) Assignee: TAICA CORPORATION, Tokyo (JP)

( * ) Notice: Subject to any disclaimer, the term of this patent is extended or adjusted under 35 U.S.C. 154(b) by 137 days.

(21) Appl. No.: 14/113,925

(22) PCT Filed: Apr. 26, 2012

(86) PCT No.: PCT/JP2012/061168
§ 371 (c)(1),
(2), (4) Date: Nov. 13, 2013

(87) PCT Pub. No.: WO2012/147829
PCT Pub. Date: Nov. 1, 2012

(65) Prior Publication Data
US 2014/0057085 A1 Feb. 27, 2014

(30) Foreign Application Priority Data

Apr. 27, 2011 (JP) ................................ 2011-099527

(51) Int. Cl.
*B44C 1/175* (2006.01)
*C09D 133/14* (2006.01)

(52) U.S. Cl.
CPC ....... *C09D 133/14* (2013.01); *Y10T 428/24802* (2015.01); *Y10T 428/24893* (2015.01); *B44C 1/1758* (2013.01); *B44C 1/175* (2013.01)

(58) Field of Classification Search
CPC .................. B44C 1/175; B44C 1/1758; Y10T 428/24802; Y10T 428/24893; Y10S 428/914

USPC ................... 427/149; 156/230; 522/109, 111
See application file for complete search history.

(56) References Cited

U.S. PATENT DOCUMENTS

| 7,951,255 B2 | 5/2011 | Ikeda et al. |
| 8,178,187 B2 | 5/2012 | Ikeda et al. |
| 2007/0051458 A1 | 3/2007 | Ikeda et al. |
| 2007/0154685 A1 | 7/2007 | Ikeda et al. |
| 2008/0199664 A1 | 8/2008 | Otaki et al. |
| 2011/0287220 A1 | 11/2011 | Ban et al. |
| 2012/0207987 A1 | 8/2012 | Ikeda et al. |
| 2012/0263884 A1 | 10/2012 | Otaki et al. |
| 2012/0321862 A1 | 12/2012 | Ikeda et al. |

FOREIGN PATENT DOCUMENTS

| JP | 2004018776 | 1/2004 |
| JP | 200514604 | 1/2005 |
| JP | 2005231340 | 9/2005 |

(Continued)

*Primary Examiner* — Bruce H Hess
(74) *Attorney, Agent, or Firm* — Pearne & Gordon LLP

(57) ABSTRACT

A coating agent to be applied and permeated into a print pattern of a water pressure transfer film has a main ingredient of a ultraviolet hardening resin composite containing a photo-polymerization monomer, a photo-polymerization oligomer and a photo-polymerization initiator, said photo-polymerization monomer has 3 or less functional groups and a volume shrinkage coefficient of 20% or less, said photo-polymerization oligomer has 10 or less functional groups, the coating agent further contains polyurethane beads having an average particle diameter of 5 through 50 micrometer and the polyurethane beads are blended at 15 through 100 weight part relative to 100 weight part of said ultraviolet hardening resin composite. This coating agent can impart a softness feeling and a wetness feeling to the surface of the decoration layer by the polyurethane beads.

20 Claims, 4 Drawing Sheets

(56) References Cited

FOREIGN PATENT DOCUMENTS

| | | |
|---|---|---|
| JP | 2006278269 | 10/2006 |
| JP | 2008201918 | 9/2008 |
| JP | 2009220419 | 10/2009 |
| JP | 2010120399 | 6/2010 |
| WO | 2004108434 | 12/2004 |
| WO | 2005077676 | 8/2005 |
| WO | 2007023577 | 3/2007 |
| WO | 2011049151 | 4/2011 |
| WO | 2011102509 | 8/2011 |

(A)

(B)

WATER PRESSURE TRANSFER METHOD, COATING AGENT FOR WATER PRESSURE TRANSFER FILM, AND WATER PRESSURE TRANSFER ARTICLE

TECHNICAL FIELD

The invention relates to a water pressure transfer method in which after an adhesion of a dried print pattern of a water pressure transfer film to be transferred under water pressure onto a surface of an article to be decorated is reproduced (recovered), the print pattern is transferred under water pressure on the article, a coating agent used for the water pressure transfer film used for the water pressure transfer method and a water pressure transfer article formed by this method.

BACKGROUND OF THE INVENTION

In order to decorate a surface of an article having a complicated three-dimensional surface, there has been used a water pressure transfer method in which a water pressure transfer film having a print pattern of non-water solubility on a water-soluble film (carrier film) is floated on a water surface in a transfer tub, the water-soluble film of the water pressure transfer film is made wet with water, the article (pattern-transferred object) is forced underwater in the transfer tub while it contacts the print pattern of the water pressure transfer film and the print pattern of the water pressure transfer film is transferred onto the surface of the article using a water pressure generated against the surface of the article when it is forced underwater whereby a decoration layer is formed.

Generally, since the water pressure transfer film is wound in the form of roll with the print pattern printed and dried on the water-soluble film, the ink of the print pattern is kept in the dry state in which the adhesion thereof is lost. Thus, it is required to apply solvent such as an activating agent or thinner to the print pattern of the water pressure transfer film to thereby make the same wet state of the print pattern as the state immediately after being printed (recover the state having the adhesion) before the water pressure transfer is carried out and this processing is usually called activation processing.

The decoration layer thus formed by water pressure transfer on the surface of the article is required to have mechanical or chemical surface protection such as abrasion resistance, solvent resistance, chemical resistance, weather resistance, etc., and to be adhered to the surface of the article with high strength.

The applicant have previously proposed the invention which can form a decoration layer by water pressure transfer while imparting abrasion resistance, solvent resistance, etc. to the decoration layer itself without applying a topcoat layer on the decoration layer (refer to patent Document 1 through 3). According to these methods, the ultraviolet hardening resin composite containing a non-solvent type activation ingredient such as a photo-polymerization monomer for reproducing (recovering) the adhesion of the dried print pattern of the water pressure transfer film is applied to the print pattern of the water pressure transfer film whereby the adhesion of the print pattern is reproduced by the activation ingredient of the ultraviolet hardening resin composite. Furthermore, the water pressure transfer of the print pattern is transferred to the pattern-transferred object in the state where the ultraviolet hardening resin composite permeates the whole print pattern whereby the print pattern and the ultraviolet hardening resin composite are integrally united with each other. Thus, as the ultraviolet hardening resin composite in the print pattern is hardened by ultraviolet-ray irradiation, it will become as if the same state as the state where ultraviolet hardenability is imparted to the decoration layer formed by the print pattern and the chemical and mechanical surface protection such as solvent resistance and abrasion resistance will be imparted to the decoration layer itself.

Also, the applicant have proposed a coating agent (an activating agent) suitable for thus applying an ultraviolet hardening resin composite to a water pressure transfer film to reproduce (recover) the adhesion of the dried print pattern and for making the ultraviolet hardening resin composite permeate the print pattern to thereby intermingle them with each other so that the print pattern and the ultraviolet hardening resin composite is harmonizingly and integrally united in order to impart the ultraviolet hardenability to the print pattern (refer to patent document 4).

The coating agent according to the patent document 4 can improve physical properties such as strength and chemical resistance of the decoration layer formed on the surface of the article by water pressure transfer and can improve the original adhesion property onto the surface of the article to thereby obtain the good decoration layer.

Meantime, the decorated article to which a skin of a user frequently touches is required to have a good tactile feeling (texture) in order to improve the feeling of use. The tactile feeling has various modes in the combination of hardness and softness feeling and a dryness and moisture feeling, but if the softness feeling and the wetness feeling (a feeling of moisture or damp) become predominant, it will become a feeling of warm texture. It is known that the softness feeling is related to the area where an inside of a finger contacts by deforming the surface when pressed by the finger, as the contact area increases, the softness feeling increases and as the back of the fingerprint is stimulated, the wetness feeling becomes damp (refer to the patent document 5).

The following methods will be considered in order to impart the tactile feeling of such a softness feeling or a wetness feeling to the article decorated by water pressure transfer.

(1) A method of applying a topcoat containing the paint imparting such tactile feeling to the water pressure transfer article.

(2) A method of adding a tactile feeling imparting layer having a wetness feeling and a softness feeling under the print pattern of the transfer film.

However, since the method for forming the decoration layer on the surface of the article by water pressure transfer while activating the print pattern of the transfer film with the ultraviolet hardening resin composite coating agent imparts the chemical and mechanical surface protection functions such as solvent resistance and abrasion resistance to the decoration layer itself, the topcoat itself is unnecessary and therefore the tactile feeling such as the softness feeling or the wetness feeling cannot be imparted by the method (1).

In the method (2), since the transfer film has a multi-layer structure because of the tactile feeling imparting layer under the print pattern, when water pressure transfer is carried out after activating the ink of the print pattern of the transfer film, it will be anticipated that the wet state of the print pattern changes due to the tactile feeling imparting layer, which causes the transfer of the print pattern to be undesirably influenced. Particularly, since the surface of the surface of the water pressure transfer article is covered with the tactile feeling imparting layer, there is a possibility that the surface protection function of the print pattern itself will be damaged by the tactile feeling imparting layer.

There is preferably formed fine unevenness on the surface of a decoration layer from a viewpoint of the mechanism of the wetness feeling for simulating slots of the fingerprint by the fine unevenness on the surface of the decoration layer. In order to form such unevenness, there has been proposed a method of water pressure transfer method for imparting the fine unevenness on the decoration layer by adding in an activating agent anon-smoothing agent such as wood flour, plastic powder, rubber crumb, minerals powder and pigments to adhere the non-smoothing agent to the printing surface of the transfer film when activating the dried print pattern of the transfer film by the activating agent (refer to Patent Document 6).

However, the activating agent used in this method is a conventional solvent type activating agent generally used and has no surface protection function on the decoration layer, which is different from the activating agent having the main ingredient of the ultraviolet hardening resin composite which does not need the solvent as shown in Patent Documents 1 through 4. If the topcoat is applied on the decoration layer in order to impart the surface protection function, then the unevenness feeling is lost and therefore both the unevenness feeling and the surface protection function cannot be imparted. Also, the application of the topcoat on the decoration layer causes the uneven portions to be disposed within the topcoat, which never deforms the uneven portions even if they are pressed by the fingers and therefore there cannot be obtained the composite feeling of the wetness feeling and the softness feeling on the decoration layer. This art is the one in which some surface coarseness feeling obtained through the topcoat applied to impart some surface unevenness to the decoration surfaces such as a wood grain pattern and a marble pattern, etc. and to obtain the tactile feeling similar to the feeling of the surface of actual wood, mineral, etc. and never the one in which the tactile feeling such as the softness feeling and the wetness feeling is imparted to the surface of the decorated article.

Even if the art of Patent Document 6 tries to be applied to the method of forming the decoration layer to the surface of the article by activating the print pattern of the transfer film with the ultraviolet hardening resin composite coating agent and carrying out the water pressure transfer, the non-smoothing agent intervenes between the article and the decoration layer and therefore the property of adhesion between the decoration layer and the article will be deteriorated and in addition thereto, with the more amount of the non-smoothing agent enlarging the more unevenness feeling, the adhesion of the decoration layer to the article will be deteriorated and as a result the art of Patent Document 6 cannot be simply applied.

PRIOR ART LITERATURES

Patent Document

Patent Document 1 WO 2004/108434
Patent Document 2 JP2005-14604A
Patent Document 3 WO 2005/77676
Patent Document 4 WO 2007/23577
Patent Document 5 JP2010-120399A
Patent Document 6 JP6-278269A

SUMMARY OF THE INVENTION

Problem(s) to be Solved by the Invention

A first problem to be solved by the invention is to provide a water pressure transfer method adapted to apply an ultraviolet hardening resin composite coating agent to a print pattern of a water pressure transfer film to thereby recover an adhesion of the print pattern and to transfer the print pattern onto a surface of an article whereby a decoration layer is formed on the surface of the article and also a tactile feeling compound with a softness feeling and a wetness feeling is imparted to the surface of the decoration layer by particular ingredients added to the coating agent when chemical and mechanical surface protection functions are imparted to the decoration layer itself by the decoration layer having the ultraviolet hardening resin composite permeating the whole print pattern and hardened by ultraviolet ray.

A second problem to be solved by the invention is to provide a coating agent for a water pressure transfer film adapted to apply an ultraviolet hardening resin composite coating agent to a print pattern of the water pressure transfer film to thereby recover an adhesion of the print pattern and to transfer the print pattern onto a surface of an article whereby a decoration layer is formed on the surface of the article and also a tactile feeling compound with a softness feeling and a wetness feeling is imparted to the surface of the decoration layer by particular ingredients added to the coating agent when chemical and mechanical surface protection functions are imparted to the decoration layer itself by the decoration layer having the ultraviolet hardening resin composite permeating the whole print pattern and hardened by ultraviolet ray.

A third problem to be solved by the invention is to provide a water pressure transfer article having a decoration layer formed by applying an ultraviolet hardening resin composite coating agent to a print pattern of a water pressure transfer film to thereby recover an adhesion of the print pattern and to transfer the print pattern onto the surface of the article whereby the decoration layer is formed on the surface of the article and also a tactile feeling compound with a softness feeling and a wetness feeling is imparted to the surface of the decoration layer by particular ingredients added to the coating agent when chemical and mechanical surface protection functions are imparted to the decoration layer itself by the decoration layer having the ultraviolet hardening resin composite permeating the whole print pattern and hardened by ultraviolet ray.

Means to Solve the Problems (Basic Principle of the Invention)

As a result of hard study, the applicant has discovered that if the volume shrinkage coefficient (ratio) after hardening an activation ingredient of an ultraviolet hardening resin composite coating agent is specified (simply referred to as only "volume shrinkage coefficient" later) and specific resin beads are blended with the coating agent at a specific ratio, then there can be imparted to the decoration layer a mechanism in which the tactile feeling having the softness feeling and the wetness feeling arbitrarily compounded occurs. The basic principle of the present invention is to preferably impart the softness feeling and the wetness feeling to the decoration layer having the surface protection self-function by carrying out the water pressure transfer using such a specified ultraviolet hardening resin composite coating agent. The first through third means to solve the problems of the invention are provided based on this principle.

Means to solve the first problem of the invention is to provide a water pressure transfer method comprising the steps of applying an ultraviolet hardening resin composite coating agent containing a photo-polymerization ingredient having at least a photo-polymerization monomer and a photo-polymerization initiator on a print pattern of a water pressure transfer film having said print pattern dried on a water-soluble film to recover an adhesion of said print pattern by said activation ingredient of said ultraviolet hardening resin composite and transferring said print pattern on a surface of an article under water pressure to form a decoration layer on the surface of said article and to form an integral layer having said print pattern and said ultraviolet hardening resin composite coating agent intermingled with said ultraviolet hardening resin composite coating agent permeated into the whole print pattern, said decoration layer formed by said integral layer whereby a chemical and physical surface protection function is imparted to said decoration layer itself by said ultraviolet hardening of said decoration layer, characterized in that said photo-polymerization monomer of said ultraviolet hardening resin composite of said coating agent has 3 or less functional groups and a volume shrinkage coefficient of 20% or less, said coating agent contains resin beads having an average particle diameter of 5 through 50 micrometer and said ultraviolet hardening resin composite and said resin beads are blended at 100 weight part versus 15 to 100 weight part.

Means to solve the second problem of the invention is to provide a coating agent for a water pressure transfer film used for a water pressure transfer method comprising the steps of applying an ultraviolet hardening resin composite coating agent containing a photo-polymerization ingredient having at least a photo-polymerization monomer and a photo-polymerization initiator on a print pattern of a water pressure transfer film having said print pattern dried on a water-soluble film to recover an adhesion of said print pattern by said activation ingredient of said ultraviolet hardening resin composite and transferring said print pattern on a surface of an article under water pressure to form a decoration layer on the surface of said article and to form an integral layer having said print pattern and said ultraviolet hardening resin composite coating agent intermingled with said ultraviolet hardening resin composite coating agent permeated into the whole print pattern, said decoration layer formed by said integral layer whereby a chemical and physical surface protection function is imparted to said decoration layer itself by said ultraviolet hardening of said decoration layer, characterized in that said photo-polymerization monomer of said ultraviolet hardening resin composite of said coating agent has 3 or less functional groups and a volume shrinkage coefficient of 20% or less, said coating agent contains resin beads having an average particle diameter of 5 through 50 micrometer and said ultraviolet hardening resin composite and said resin beads are blended at 100 weight part versus 15 to 100 weight part.

In the means to solve the first and second problems of the invention, said resin beads preferably have a glass transition temperature (measured based on JIS K7121) of −50 to 100° C. and these resin beads may be preferably polyurethane beads. In this case, the polyurethane beads have the glass transition temperature (measured based on JIS K7121) of −50 to 50° C. The photo-polymerization oligomer preferably has the glass transition temperature Tg of 40° C. or less.

In the means to solve the first and second problems of the invention, the coating agent may further contains particulate silica of average particle of 0.005 to 10 micrometer and is blended so that the resin beads and the particulate silica have the ratio of 100 weight part versus 0.5 to 10 weight part.

In the means to solve the first and second problems of the invention, the coating agent may preferably further contain a reactive silicone based ingredient.

In the means to solve the first and second problems of the invention, the coating agent may preferably further contain a polyol.

In the means to solve the second problem of the invention, the coating agent may be preferably in two liquid component form of a first liquid component containing the photo-polymerization ingredient (at least a photo-polymerization monomer) and a second liquid component containing non-reactive resin and the other ingredients may be blended with either of the liquid components.

Means to solve the third problem of the invention is to provide a water pressure transfer article having a decoration layer formed by the means to solve the first problem of the invention.

Effect of the Invention

According to the invention, since the photo-polymerization monomer of the ultraviolet hardening resin composite of the coating agent for imparting the chemical and mechanical surface protection function to the resultant decoration layer by applying the coating agent to the print pattern of the transfer film to activate the print pattern and permeating the coating agent into the whole print pattern has the three or less functional groups and the volume shrinkage coefficient of 20% or less, the coating agent contains resin beads having an average particle diameter of 5 through 50 micrometer and the ultraviolet hardening resin composite and the resin beads are blended at 100 weight part versus 15 to 100 weight part, there can be imparted to the decoration layer the tactile feeling having the wetness feeling and the softness feeling arbitrarily compounded without any application of a topcoat and without any multi-layer of the transfer film by the surface unevenness obtained by the specific average particle diameter of the resin beads and the proper volume shrinkage coefficient of the photo-polymerization monomer.

FORMS OF EMBODIMENT OF THE INVENTION

Figure 1:
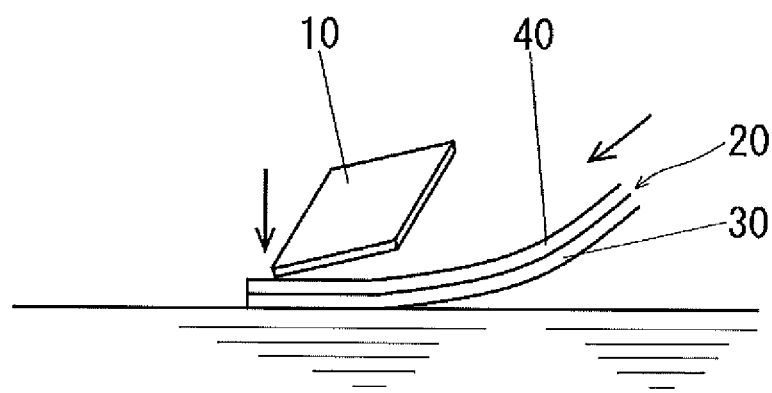
FIG. 1 is a schematic diagram of water pressure transfer carried out by the method of the invention.

Describing the forms of the embodiment of the invention with reference to the drawings, FIG. 1 schematically illustrates a water pressure transfer method to which the invention is applied. This water pressure transfer method is a method in which a transfer film 20 comprising a water-soluble film (carrier film) 30 having a print pattern 40 applied thereon is supplied and floated on water 50 in a transfer tub with the print pattern 40 upwardly directed and an article to be pattern-transferred under water pressure is forced under water 50 through the transfer film 20 to thereby carry out the water pressure transfer.

The water-soluble film 30 is formed of water-soluble material having polyvinyl alcohol, for example as a main ingredient which absorbs water to be made wet and softened. The water-soluble film 30 is softened by contacting water 50 in the transfer tub and attached around the article to be decorated whereby the water pressure transfer can be carried out. In a general water pressure transfer, the print pattern 40 may be previously applied on the water-soluble film 40 by gravure printing or the like and is in a dried and hardened state where the adhesion is completely lost before the water pressure transfer in order to store the transfer film in a state of being wound on a roll. The print pattern 40 includes a plain (non-pattern) print layer other than the pattern layer in a strict meaning.

Figure 2:
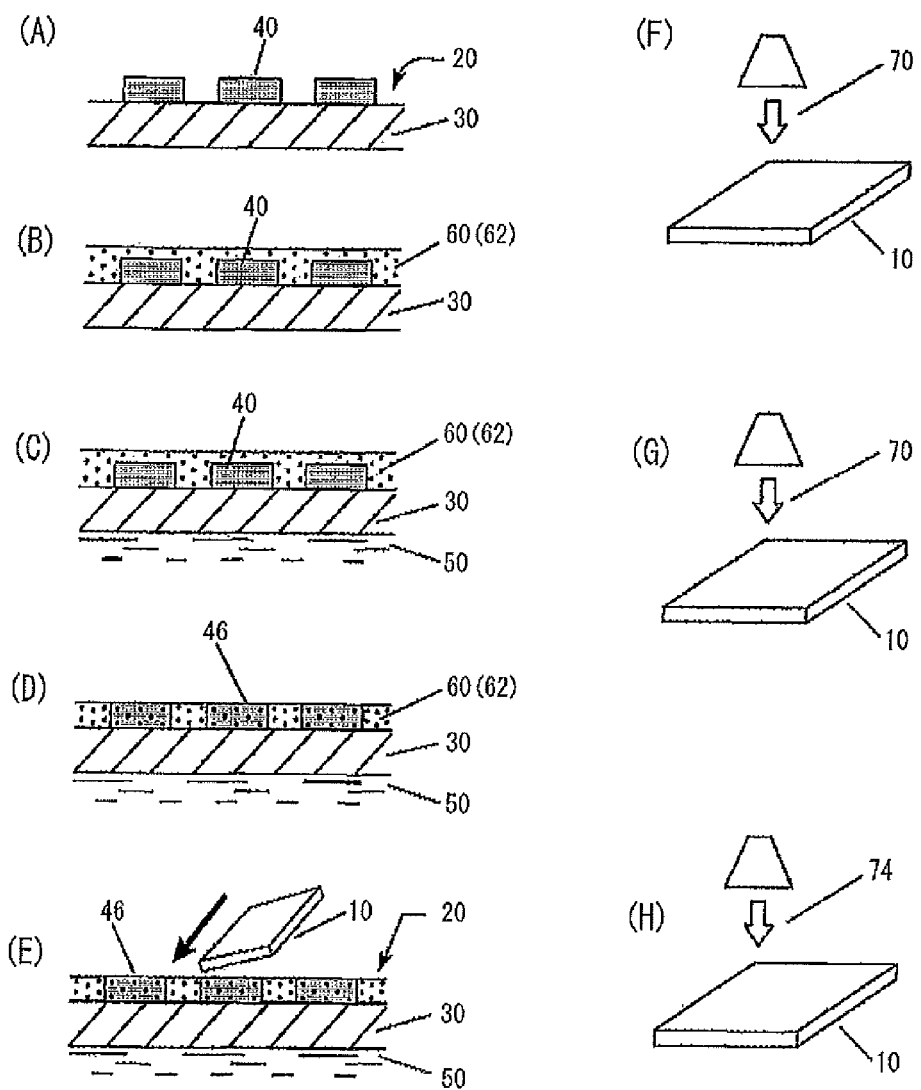
FIG. 2 schematically illustrates each process of the method for carrying out the water pressure transfer to an article by the method of the invention.

As shown in FIG. 2, the water pressure transfer method to which the invention is applied is a method in which a coating agent (activating agent) 60 containing an ultraviolet hardening resin composite 62 as a main ingredient is applied onto the print pattern 40 of the transfer film 20 (see FIG. 2B) before applying the water pressure transfer method onto the article 10 (see FIG. 2A) whereby the adhesion of the print pattern 40 is recovered (reproduced) by the non-solvent activation ingredient in the ultraviolet hardening resin composite and also the ultraviolet hardening resin composite 62 permeates and is absorbed into the whole print pattern 40 (the whole area and the whole thickness) to thereby intermingle the ultraviolet hardening resin composite 62 with the print pattern 40 (see FIG. 2C). In this manner, the ink composite of the print pattern 40 and the ultraviolet hardening resin composite 62 applied on the print pattern 40 to permeate into the print pattern 40 are integrally mixed to form an ultraviolet hardenability resin composite mixture print pattern (unification layer) 46 (see FIG. 2D).

Thus, after carrying out on the article 10 the water pressure transfer of the transfer film 20 having the ultraviolet hardenability resin composite mixture print pattern 46 recovered by the ultraviolet hardening resin composite 62 and formed with the ultraviolet hardening resin composite 62 intermingled with the whole print pattern 40 (see FIG. 2E), the ultraviolet ray 70 is irradiated onto the article 10 (see FIG. 2F) whereby the ultraviolet hardening resin composite 62 in the ultraviolet hardening resin composite mixture print pattern 46 is hardened integrally with the print pattern 40. This is just equivalent to the ultraviolet hardenability imparted to the print pattern 40 itself. Therefore, the decoration layer 44 formed by the transfer of the ultraviolet hardening resin composite mixture print pattern 46 results in having the surface protection function imparted to the decoration layer itself by the distribution of the ultraviolet hardening resin composite and the ultraviolet hardening (see FIG. 3).

The irradiation of the ultraviolet ray 70 of FIG. 2F may be preferably carried out while the water-soluble film 30 of the water pressure transfer film 20 is wound around the article 10 having the ultraviolet hardening resin composite mixture print pattern 46 transferred. Therefore, the ultraviolet-ray irradiation process may be preferably carried out while the article is still underwater although not shown or after the article is taken out of the water, but before a water washing operation is carried out for removal of the water-soluble film. The ultraviolet ray 70 may be irradiated by using the well-known ultraviolet hardening device including a light source such as a high-pressure mercury lamp, a metal halide lamp, etc and an irradiation device (lamp house).

Figure 3:
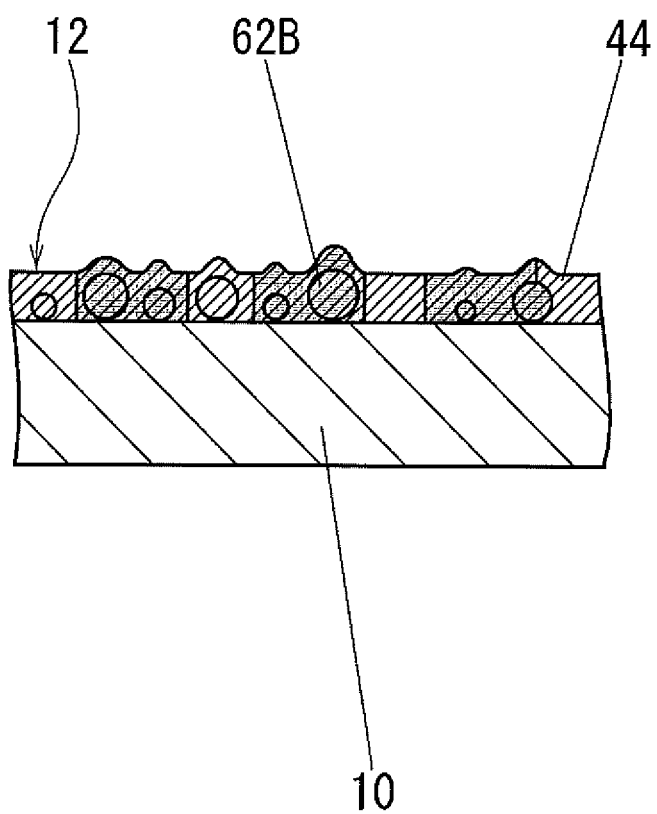
FIG. 3 is an enlarged cross sectional view of the article having the decoration layer obtained by the method of FIG. 2 wherein there are schematically shown the resin beads added to the resin composite in the decoration layer.

Thereafter, as shown in FIG. 2G, the article 10 is washed by a shower 72 etc., to remove the water-soluble film (swelling soluble film layer) covering the upper surface of the decoration layer 44 (see FIG. 3) formed on the article 10 and as shown in FIG. 2H, the surface of the article is dried by hot wind 74 to thereby complete the decorated article 12 having the decoration layer 44 transferred under water pressure on the surface of the article 10 (see FIG. 3).

(Explanation of the Composition of the Coating Agent of the Invention)

The ultraviolet hardening resin composite 62, the main ingredient of the coating agent 60 of the invention is a resin which can be hardened by the chemical action of the ultraviolet ray for a relatively short time. As already described in the Patent Documents 1 through 4 the resin composite 62 may be in the form of ultraviolet hardening type paint, ultraviolet hardening type ink, ultraviolet hardening adhesive, etc., and fundamentally may include (1) a photo-polymerization ingredient having at least a photo-polymerization monomer and (2) a photo-polymerization initiator, but the photo-polymerization ingredient may include a photo-polymerization oligomer (pre-polymer) in addition to the photo-polymerization monomer. The resin composite is similar to the conventional one in view of the liquid state before the hardening by the ultraviolet ray irradiation, but the coating agent of the invention is characterized by being formed by adding predetermined resin beads 62B (see FIG. 3) to the ultraviolet hardening resin composite. Of course, the coating agent is required to have predetermined viscosity and ink solubility.

From the viewpoint of complex tactile feeling imparted, the ultraviolet hardening resin composite among the coating agent of the invention has a role to impart the softness feeling of the decoration layer while the resin beads have a role to partially contribute to the softness feeling as well as impart the wetness feeling, but these roles are accomplished by the volume shrinkage coefficient of the photo-polymerization ingredient and the particle diameter and the amount of addition of the resin beads satisfying the specific conditions as described in detail later.

(Ultraviolet Hardening Resin Composite, a Main Ingredient of the Coating Agent)

The coating agent for water pressure transfer films used for the invention has an ultraviolet hardening resin composite as the main ingredients and the ultraviolet hardening resin composite contains a photo-polymerization ingredient including at least a photo-polymerization monomer and a photo-polymerization initiator, the photo-polymerization monomer has 3 or less functional groups and a volume shrinkage coefficient of 20% or less, the coating agent containing resin beads having an average particle diameter of 5 through 50 micrometer and the resin beads are blended with the ultraviolet resin composite at 100 weight part versus 15 to 100 weight part. The photo-polymerization ingredient preferably contains a photo-polymerization oligomer having ten or less functional group. The photo-polymerization ingredient of the ultraviolet hardening resin composite may be the photo-polymerization oligomer of 0 to 65 weight % and the photo-polymerization monomer of 30 to 95 weight % and the photo-polymerization initiator may be blended at a ratio of 5 to 10 weight %. The photo-polymerization oligomer used may be either of or arbitrary combination of either of acrylic oligomer, polyester based oligomer, epoxy acrylate based oligomer, urethane acrylate based oligomer or the like. The volume shrinkage coefficient of the photo-polymerization oligomer may be preferably 20% or less like that of the photo-polymerization monomer. The reason is that if the volume shrinkage coefficient of the photo-polymerization oligomer exceeds 20%, then the resin composite after ultraviolet hardening will become hard too much and therefore the softness feeling will be reduced.

The photo-polymerization monomer serves to maintain the solvent power of ink and the adhesion to the surface of the article. The reason why the functional group of the photo-polymerization monomer is three or less is that if it exceeds four, then the resin composite after ultraviolet hardening will get too hard and even if it is forcedly pressed by a finger, it will fail to be deformed to thereby reduce the softness feeling. If the ultraviolet hardening resin composite contains no photo-polymerization oligomer, it may be desirably a combination of the monomer of two functional group and the monomer of three functional group rather than an individual monomer of two functional group from the viewpoint of the membrane strength of the decoration layer. The reason why the volume shrinkage coefficient of the photo-polymerization monomer is set at 20% or less is that if the volume shrinkage coefficient of the photo-polymerization exceeds 20%, similarly the resin composite after ultraviolet hardening gets too hard and therefore the softness feeling would be reduced. Herein, the volume shrinkage coefficient of the photo-polymerization monomer and the photo-polymerization oligomer may be determined by the following expression using the specific gravity σL before hardened (liquid weighting method using a specific gravity bottle based on JIS K5600-2-4) and the specific gravity σs after hardened (liquid weighing method based on (JIS Z8807-4);

Volume shrinkage coefficient (%)=[1−(σs/σL)]×100.

"σS" is what is obtained by being hardened with integral light volume 1558mJ/cm$^2$ and a peak intensity of 302 mW/cm$^2$ using a UV light source of a wavelength of 365nm.

Describing the concrete examples of the photo-polymerization monomer, there are 1.6 hexanediol diacrylate, cyclohexyl acrylate and dipropylene glycol diacrylate, for example as two functional group monomer.

The functional group of the photo-polymerization monomer and the photo-polymerization oligomer is set at the number of functional groups suitable for the desired softness feeling within the aforementioned limits, but the most preferable functional group is two functional groups for both of the photo-polymerization monomer and the photo-polymerization oligomer and especially the photo-polymerization oligomer is preferably two functional group resin of straight chain structure. In this way, the decoration layer can have the elasticity like a spring and much more desirable softness imparted thereto.

The photo-polymerization initiator is for initiating the photo-polymerization reaction of the photo-polymerization oligomer and the photo-polymerization monomer. In the coating agent of the invention, in order for the ultraviolet hardening resin composite to dissolve the dried and solidified ink and permeate the print pattern, the photo-polymerization initiator may preferably contains both of surface hardening type photo-polymerization initiator and internal hardening type photo-polymerization initiator. The surface hardening type photo-polymerization initiator which may be used is a hydroxy ketone based initiator, for example while internal hardening type photo-polymerization initiator which may be used is an acyl-phosphine oxide based initiator, for example.

(Resin Beads, an Additive of the Coating Agent)

The reason why the average particle diameter of the resin beads 62B added to the coating agent is 5 to 50 micrometers is that if the particle diameter is less than 5 micrometers, then the resin beads cannot contact the bottom of the grooves of the fingerprint when the finger touches the decoration layer and therefore there occurs shortage of the tactile feeling and that if the particle diameter exceeds 50 micrometers, then the surface of the decoration layer would be in the rough state and therefore there occurs too much poor appearance, The particle diameter of the resin beads is the value (median diameter: $D_{50}$) measured and averaged by a laser diffraction type particle size distribution measurement device based on the laser diffracting method of JIS Z8825-1. The desirable amount of addition of the resin beads is 15 to 100 weight part relative to 100 weight part of the ultraviolet hardening resin composite and its reason will be explained later in detail, while comparing Examples of the invention and Comparisons.

The particle diameter of the resin beads is set at a value suitable for the desired wetness feeling within the aforementioned limits. Since the wetness feeling is imparted by the surface unevenness (see FIG. 3) when stroking the surface of the decoration layer, it may be influenced by the blend amount in addition to the particle diameter of the resin beads and therefore the wetness feeling of the decoration layer may be adjusted by the blend mount and the particle diameter of the resin beads. The particle diameter is expressed by the average value of various particle diameters, but even if they have the same average particle diameter of the resin beads, they preferably contain the combined resin beads of different particle diameters rather than the substantially identical average particle diameter.

As already described, the particle diameter of the resin beads 62B is 5 to 50 micrometers, but the decoration layer is set at a thickness substantially corresponding to the unevenness formed with the shape of the resin beads 62B reflected as shown in FIG. 3 and thereby a good wetness feeling can be obtained.

As already described, since the resin beads 62B are the component which itself has the softness feeling, the resin beads can impart the softness feeling in addition to the wetness feeling. Since the resin beads having such property are polyurethane beads, the resin beads which may be used are preferably polyurethane beads.

(Particulate Silica, Another Additive of the Coating Agent)

The coating agent of the invention may have particulate silica of average particle diameter of 0.005-10 micrometers added. The blend ratio of the particulate silica may be preferably set at 0.5 to 10 weight part relative to 100 weight part of the resin beads. Although the particulate silica functions as a matting agent, it can further impart thixotropy to the coating agent. The thixotropy of the particulate silica can form the fine unevenness without any increase in the addition amount of the resin beads with the plurality of resin beads in the coating agent disposed between the decoration layer and the pattern-transferred article in the state of bead groups (bead lumps) formed by collecting the resin beads into a lump whereby there can additionally increase the tactile feeling having the softness feeling and the wetness feeling compounded due to the ultraviolet hardening resin composite.

The reason why the average particle diameter of particulate silica was 0.005-10 micrometers is that if the average particle diameter is less than 0.005 micrometer, then the thickening property of the coating agent would be heightened to thereby make the application operation of the coating agent difficult and that if the average diameter exceeds 10 micrometers, then the thixotropy of the coating agent would be lost to thereby make the application operation of the coating agent difficult, similarly. The value of the particle diameter of the particulate silica is a value obtained by measuring and averaging the longest diameter of the contour of the particle image each of 1000 particles of the particulate silica selected at random in the image of the magnification in which the particle diameter of the particulate silica can be visually recognized by SEM or TEM (transmission electron microscope). The reason why the blend amount of the particulate silica is 0.5 to 10 weight part is that if the blend amount is less than less than 0.5 weight part, then the action to collect the resin beads would be reduced to accomplish no function to impart the tactile feeling of the complex softness and wetness feeling without any increase in the addition amount of the resin beads and that if the blend amount exceeds 10 weight part, then the thickening property would be heightened to thereby make the application operation of the coating agent difficult.

(Glass Transition Temperature of the Ultraviolet Hardening Resin Composite and the Resin Beads)

The glass transition temperature Tg of the ultraviolet hardening resin composite and the resin beads is an element for adjusting the softness of the decoration layer, but it is so set that the transfer property of the print pattern is not damaged when carrying out the water pressure transfer of the print pattern. The glass transition temperature Tg of the ultraviolet hardening resin composite may be adjusted by the glass transition point Tg of the photo-polymerization ingredient, but preferably adjusted by the glass transition temperature of the included photo-polymerization oligomer. The glass transition temperature of the photo-polymerization oligomer may be set at 40° C. or less and the glass transition temperature of the resin beads is preferably set at −50 to 100° C. The value of these glass transition temperatures is a value according to the DSC method based on JIS K7121. However, when the clear glass transition cannot be observed by the DSC method, it can make the value of the TMA method based on JIS K7121.

With the glass transition temperature Tg of the photo-polymerization oligomer set at 40° C. or less, the elasticity of the ultraviolet hardening resin composite after hardening can be obtained and this makes the amount of deformation of the decoration layer when pushed larger and therefore much softer feeling can be imparted thereto whereby the adjustment of the softness feeling can be more easily made. Since the lower glass transition temperature Tg of the photo-polymerization oligomer can impart the softer feeling to the decoration layer, the glass transition temperature Tg is desirably lower and especially 0° C. or less is much more desirable.

With the glass transition temperature Tg of the resin beads set at −50° C. to 100° C., the decoration layer when pushed can be easily deformed to thereby impart the more flexible feeling to the decoration layer and be able to easily apply the ultraviolet hardening resin composite coating agent to the transfer film with the relation to the coating operation property of the ultraviolet hardening resin composite coating. With the glass transition temperature of the resin beads being less than −50° C., there is imparted by the improvement on the softness of the decoration layer to the decoration layer the more tactile feeling combined with the wetness feeling, but since due to the large oil absorption of the resin beads in the ultraviolet hardening resin composite coating agent before being hardened, the viscosity of the ultraviolet hardening resin composite coating agent tends to increase, the coating operability to the transfer film and the extensibility of the transfer film will be lowered and the transfer operability to the article will be sometimes lowered. If the glass transition temperature of the resin beads exceeds 100° C., the hardness of the resin beads would become higher and therefore the softness feeling imparting action would be lowered. Thus, the glass transition temperature of the resin beads is preferably set within the aforementioned range. In case where the resin beads are polyurethane beads, the glass transition temperature Tg thereof preferably has the lower limit −50 to 50° C., which is still lower than the aforementioned value.

With the glass transition temperature Tg of both of the photo-polymerization oligomer and the resin beads being 30° C. or less, the softness of the print pattern of the transfer film, i.e., the resultant decoration layer gets synergistically better and therefore this is preferable for imparting the softness feeling. The glass transition temperature Tg of the photo-polymerization monomer of the ultraviolet hardening resin composite is preferably adjusted to 40° C. or less, which is the same range as that of the photo-polymerization oligomer. In the DSC method based on the JIS K7121 or in the TMA method based on JIS K7121, the glass transition of the photo-polymerization monomer cannot be often observed clearly (the glass transition temperature cannot be specified), but the invention never excludes the use of such photo-polymerization monomer.

(Plasticizer, a Further Additional Additive of the Coating Agent)

In the invention, in order to impart the softness to the ultraviolet hardening resin composite after hardened, the softness feeling of the decoration layer can be supplemented by adding a plasticizer to the ultraviolet hardening resin composite. The plasticizer has no particular limitation if the softness can be imparted without remarkably damaging the fundamental physical properties which the decoration layer of the water pressure transfer article requires and the plasticizer which may be used is publicly known component such as phthalate based one of dibutylphthalate (DBP), for example, a maleic acid based one, a phosphoric acid based one, an adipic acid based one etc. The amount of addition of the plasticizer is suitably adjusted according to the balance of the basic property of the decoration layer and the softness thereof.

(Reactive Silicone Ingredient, a Further Additional Additive of the Coating Agent, Part 1)

Figure 4:
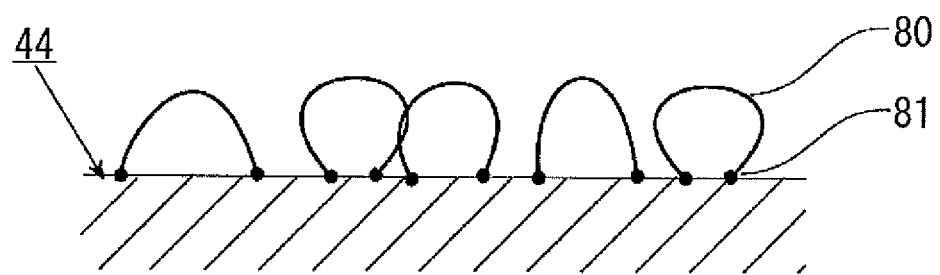
FIG. 4 is an enlarged cross sectional view of the state where the molecule chain of the silicone ingredient is formed in the surface of the decoration layer obtained by the method of FIG. 2 using the coating agent having the reactive silicone ingredient added.
Figure 4:
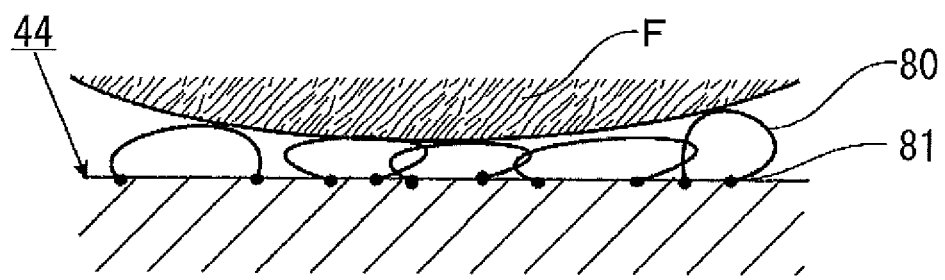

In the invention, in order to supplement the softness imparted to the ultraviolet hardening resin composite after hardened, a reactive silicone based ingredient may be added. Since the reactive silicone ingredient has the specific gravity smaller than the unhardened ultraviolet hardening resin composite has, the reactive silicone ingredient is transferred to the surface of the decoration layer after the application of the coating agent and the transfer of the print pattern and the reaction layer of then ultraviolet hardening resin composite and the reactive silicone ingredient is formed on the surface of the decoration layer after hardened and therefore there can be obtained the feeling having further more softness. Example of the reactive silicone ingredient preferably used for supplementing the softness may be a silicone ingredient having an organic functional group at both ends, especially more preferably silicone oil having an organic functional group at both ends. In case where the silicone ingredient having the organic reaction group at both ends is used, as shown at a numeral 81 of FIG. 4A, the functional group at both ends of the silicone ingredient and the and ultraviolet hardening resin composite react with each other, silicone molecule chain 80 in the form of arch having both ends bonded with the decoration layer is formed near the surface of the decoration layer after hardened. It is considered that when a finger F touches the decoration layer 44 as shown in FIG. 4B, the spring operation based on the bending and the restoration of this arch-like silicone molecule chain 80 is imparted to the decoration layer 44 whereby there occurs the softness feeling on the decoration layer 44. The functional group of both ends have no specific limitation if it has a reactivity with the ultraviolet hardening resin composite and never damages the effect of the invention, but there may be preferably used the silicone ingredient having an acrylate based functional group in case where the ultraviolet hardening resin composite is an acrylate based one.

(Reactive Silicone Ingredient, a Further Additional Additive of the Coating Agent, Part 2)

With the reaction layer of the silicone ingredient and the ultraviolet hardening resin composite formed on the surface of the decoration layer, a surface frictional coefficient becomes smaller to thereby impart slip characteristics, which causes the abrasion resistance of the decoration layer to be improved. In this case, it is much more advantageous on the effect to use the silicone ingredient of more dimethyl group and longer straight chain. Further, this reaction layer imparts wettability of silicone to the surface of the decoration layer and therefore there are additionally generated the effect of antifouling property or perspiration resistance. The reactive silicone ingredient may have a functional group which can add other physical properties to the straight chain. For example, in case where the photo-polymerization ingredient (the photo-polymerization monomer or both of the photo-polymerization oligomer and the photo-polymerization monomer) is acrylic based, if the methacrylic denaturation silicone oil having a methacrylic group for the straight chain is used, the crosslinking reaction of the methacrylic denaturation silicone oil and the photo-polymerization ingredient progresses and therefore the heat resistance and the light proof of the decoration layer can be improved.

(Reactive Silicone Ingredient, a Further Additional Additive of the Coating Agent: Part 3)

Although the amount of addition of the reactive silicone ingredient may be suitably set within the range where the above-mentioned effect can be obtained, too large amount of addition undesirably reduces the property of adhesion of the decoration layer to the article (pattern-transferred object). Specifically, the desirable amount of addition ranges from 0.1 to 15 weight part relative to the ultraviolet hardening resin composite.

(Summary of Imparting the Softness Feeling and the Wetness Feeling)

As aforementioned, the tactile feeling having the balance of the softness feeling and the wetness feeling properly adjusted can be imparted to the decoration layer by the cooperation of the ingredient of the ultraviolet hardening resin composite with the resin beads, but in the case where the bigger softness feeling is required, for example, the agent can be formed so that both of the hardened material of the ultraviolet hardening resin composite and/or the resin beads may become soft and in the case where the bigger witness feeling is required, the size and the amount of addition of the resin beads may be adjusted within the above specified range of the invention whereby the fine unevenness adapted to easily fit the fingerprint slot can be formed. Since the coating agent of the invention can impart to the decoration layer the tactile feeling having the softness feeling and the wetness feeling compounded without damaging the adhesion property of the coated film, the tactile feeling having the softness feeling and the wetness feeling arbitrarily combined can be imparted to the decoration layer having a surface self-protection function by the permeability of the ultraviolet hardening resin without any requirement of the topcoat.

(Means for Prevention of the Resin Beads from Falling Out: Part 1)

In order to prevent the resin beads from falling out when the decoration layer is rubbed, i.e., in order to improve the scratch-proof of the decoration layer, the resin beads may preferably have an end where the hydroxyl group (OH radical) is combined with the surface and the form of adding the ingredient having an isocyanate group to the ultraviolet hardening resin composite. The reason will be guessed as follows. Namely, since the hydroxyl group of the surface of the resin beads will react with the isocyanate group of the ingredient having the isocyanate group (NCO radical) to form the urethane bond whereby the molecule chain connected with the resin beads is formed, the molecule chain is involved in the bridge structure of the photo-polymerization ingredient whereby the resin beads are still more firmly fixed to the decoration layer. The ingredient having the isocyanate group may be an isocyanate having no photo-polymerization or a photo-polymerization ingredient modified by isocyanate. In the latter case, the ultraviolet hardening resin composite and the resin beads are chemically bonded by urethane linkage. Since the effect of the prevention of the resin beads from falling out becomes larger in relation to the cooperation with the ingredient having the isocyanate group as the number of hydroxyl groups of the resin beads increases, the number of hydroxyl groups may be adjusted to the proper number within the range where the formation or the physical properties of the decoration layer cannot be damaged. Although the amount of addition of the isocyanate is properly set according to the number of hydroxyl groups (OH radical), the ratio of the number of isocyanate groups to the number of hydroxyl groups may be preferably one or more in general and more preferably set at 1.5 or more times especially.

(Means for Prevention of the Resin Beads from Falling Out: Part 2)

Furthermore, polyol may be added in addition to the ingredient having the above-mentioned isocyanate group to the ultraviolet hardening resin composite. Since the polyol makes a urethane reaction with the isocyanate group, the polyol is connected therewith to form a still longer molecule chain in the resin beads and therefore the molecule chain tends to be entangled by means of the bridge structure of the photo-polymerization ingredient whereby the effect of the prevention of the resin beads from falling out can be further improved. As the polyol has the number of the hydroxyl group increased (the number of functional group increased), the points of reaction with the isocyanate ingredient increases whereby the molecular chain tends to be entangled by the bridge structure of the photo-polymerization ingredient whereby the effect of the prevention of the resin beads from falling out and further the mechanical properties of the decoration layer can be effectively improved. Furthermore, in case that the polyol used is a branched polyol, there can be formed the more complicated bridge structure and as a result, the effect of the prevention of the resin beads from falling out and the improvement on the mechanical properties of the decoration layer can be effectively made. As the number of the branching (the number of the side chain) increases, (as the number of branch increases, the number of hydroxyl group increases,) the effects get larger. That is, if the polyol is of branch-type, for example and the number of functional groups is 10 or more functional groups (the number of hydroxyl groups is 10 or more), for example, the effect of prevention of the resin beads from falling out will be more remarkable by means of the both synergistic effect. In this case, the amount of addition of the isocyanate may be preferably set so that the ratio of the number of the isocyanate groups relative to the sum of the number of hydroxyl groups of the resin beads and the number of hydroxyl groups of the polyol may become one or more.

(Means for Prevention of the Resin Beads from Falling Out: Part 3)

Unlike the first means for prevention of the resin beads from falling out, there may be the structure where the hydroxyl group is introduced into a part of the photo-polymerization ingredient of the ultraviolet hardening resin composite and the resin beads and the photo-polymerization ingredient may be connected by the urethane bond through the ingredient having the isocyanate group added to the ultraviolet hardening resin composite. The urethane reaction may be performed by heating after the ultraviolet hardening or simultaneously with the ultraviolet hardening by using the heat generated on the irradiation of the ultraviolet ray or by heating at the same time when the ultraviolet ray is irradiated.
(Means for Prevention of the Resin Beads from Falling Out: Postscript)

Although the isocyanate in the first through third means for prevention and the polyol in the second means for prevention are never limited in particular so long as the effect of the prevention of the resin breads from falling out is obtained, the isocyanate may be preferably of burette reaction type because it is excellent in the effect of the prevention from falling out and the polyol is preferably of polycarbonate based one from the viewpoint of hydrolysis-proof property.
(Example of Concrete Composition of the Coating Agent)

The concrete blended ingredient and blend ratio of the coating agent are as follows and the additives A through C are used independently or in a combined state.

| (I) Ultraviolet hardening resin composite | 100 weight part |
|---|---|

(Item Details)
The ultraviolet hardening resin composite contains the following ingredients (1) through (3) at the prescribed ratio.

| (1) photo-polymerization oligomer | 0 to 65 weight % |
|---|---|
| (2) photo-polymerization monomer | 30 to 95 weight % |
| (3) photo-polymerization initiator | 5 to 10 weight % |

The above ultraviolet hardening resin composite may contain the following additives (4) through (6) and the blend ratio of the quantity of these additives is a ratio relative to the sum total (100 weight %) of the ingredients (1) through (3). Thus, the weight % of the whole ultraviolet hardening resin composite containing the additives will exceed 100 weight %.

| (4) non-reactive resin | 2 to 12 weight-% |
|---|---|
| (5) light-proof imparting agent | |
| UV-A | 0.5 to 8 weight % |
| HALS | 1.5 to 3.5-weight % |
| (6) leveling agent | 0.01 to 0.5-weight % |
| (7) solvent | 5 to 50 weight % |
| (II) Resin beads | 15 to 100 weight part |

(III) Additive A (Abrasion Resistance Improvement Agent)
In case where the resin beads have the hydroxyl group imparted and the surface modified.
(8) The Ingredient Having the Isocyanate Group
Blend ratio where the ratio of the number of isocyanate group to the number of hydroxyl group on the surface of the resin beads becomes one or more
(9) Polyol
Amount of blend within the range where the film physical property of the decoration layer is not damaged.
(IV) Additive B (Resin Bead Collecting Agent)
(10) Particulate silica 12.5 to 37.5 weight part relative to 100 weight part of the resin beads
(V) Additive C (softness reinforcement and abrasion resistance improvement agent)
(11) Both terminals reactive silicone ingredient 0.1 to 15 weight part relative to the ultraviolet hardening resin composite.

The non-reactive resin (4) of the arbitrary additives among the above-mentioned concrete blended ingredients may be acrylic polymer and the non-reactive resin has the function to accommodate the properties of the decoration layer formed by the water pressure transfer such as the physical property and the chemical property thereof and the adhesion of the decoration layer to the pattern-transferred article. The light-proof imparting agent (5) may contain a ultraviolet ray absorbent (referred to as "UV-A" later) and a hindered amine based light stabilizer (referred to as "HALS" later) and can improve the light-proof while maintaining the adhesion in the blend ratio of the specified range. The leveling agent (6) can adjust the fluidity of the coating agent without damaging the adhesion of the decoration layer.
(Solvent Blended Additionally)

The coating agent of the invention may contain the solvent for the purpose of adjusting the viscosity thereof so as to easily coat (apply) the coating agent and for the purpose of distributing the non-reactive resin of the additives. It should understand that the "solvent" contained in the coating agent should be used in such characteristic (solvent power to the print pattern) and amount of addition thereof as the activation of the print pattern by the photo-polymerization monomer of the ultraviolet hardening resin composite which is the main ingredients of the coating agent is never damaged. The fundamental difference between the solvent type coating agent (activating agent) and the non-solvent type activation ingredient of the ultraviolet hardening resin composite is as follows: That is, in the former activating agent, the plastic state of the ink by the appearance of the adhesion of the ink changes with time because the solvent ingredient of the activating agent volatilizes after its application, but in the latter coating agent (the activation ingredient used in the invention), since the adhesion of the ink is reproduced by the photo-polymerization monomer ingredient which never volatilizes, the plastic state of the ink never changes. The activating agent of the invention never damages the plastic state of the ink so long as the blend amount of the photo-polymerization monomer is within the specified range even if the solvent is blended together within the range fulfilling the above-mentioned conditions. The desirable amount of addition of the solvent for such a purpose is 5 through 50 weight % to the sum total of the photo-polymerization oligomer, the photo-polymerization monomer and the photo-polymerization initiator among the ultraviolet hardening resin composite.
(Addition of the Resin Beads to the Ink of the Transfer Film)

In the invention, there may be used the transfer film having the print pattern formed from the ink containing the resin beads of the same ingredient as those added to the coating agent of the invention. With such transfer film used, the tactile feeling imparting effect by the coating agent can be improved additionally. In this case, since the viscosity of the coating agent can be adjusted to the lower value if the amount of addition of the resin beads to the coating agent decreases, the coating operation of the coating agent can be improved and since the resin beads are added also to the transfer film, the tactile feeling is never reduced even if the amount of application of the coating agent decreases.
(Storage State=Two Liquid Component Type; Part 1)

In the coating agent of the invention, the resin beads added to the coating agent of the invention in order to impart the softness feeling to the decoration layer has the glass transition temperature Tg lower and the oil absorption higher and the amount of addition thereof is more than that of the resin beads for the matting agent, which is different from the resin beads added for the conventional matting agent. Thus, if the coating agent is stored under an inferior environment such as a high temperature atmosphere, then there occurs an anxiety that the coating agent would be thickened and solidified. In this case, the resin beads can be stored in a second liquid component in the state separated from a first liquid component, which can preferably delete the anxiety. In such a storage form, since the amount of addition of the resin beads can be adjusted when used, there may be an additional effect where the tactile feeling imparting effect by the coating agent can be adjusted to a desired one.

(Storage Form=Two Liquid Component Type; Part 2)

In such storage and usage form, the second liquid component containing the resin beads may be distributed in a low reaction solvent may be distributed in a state of a paste or a liquid for easing the dispersiibility and the operation efficiency in a mixed operation where the second liquid component is mixed with the first liquid component and a publicly known dispersing agent may be added for improving the dispersibility. Such a low reaction solvent which may be used is the solvent for paints such as long-chain hydrocarbon based mixed type solvent or mineral spirit, etc. This solvent need be properly selected and adjusted within the range of the characteristic (solvent power to the print pattern) and the amount of addition where the activation of the print pattern by the photo-polymerization monomer of the ultraviolet hardening resin composite which is the main ingredient of the coating agent is never damaged In case where the resin beads are the combination of a plurality of resin beads having the kind and the quality different from each other, these resin beads may be mixed within the second liquid component or may be separated from each other in the form of a plurality of second liquid components of paste or liquid (2A liquid component, 2B liquid component, etc., for example) for each of the plurality of resin beads. In case where the plurality of second liquid components are set, when these second liquid components are mixed for usage, the composition such as the particle size distribution and the glass transition temperature of the resin beads of the activating agent can be properly set by adjusting the ratio of mixture of the plurality of second liquid components having the different resin beads distributed therein whereby the degree of the tactile feeling by the coating agent can be more finely adjusted. Otherwise, the resin beads identical to those to be blended in the second component or the resin beads having at least one of the shape, property and materials different from those to be blended in the second component may be blended in the first liquid component within the range where there occurs no faults. In case where the non-reaction resin is added to the coating agent of the invention, it often induces a thermal polymerization of the ultraviolet hardening resin composite with high temperature and therefore, the non-reaction resin may be preferably blended in the second liquid component in the form of two liquid component.

EXAMPLE

There will be explained concrete 44 Examples according to the invention while being compared with 6 Comparisons. Tables 1 through 6 show various ingredients used for the Examples of the invention and the Comparisons wherein Tables 1 and 2 show ultraviolet hardening resin composites A (oligomer and monomer based composite) and B (monomer based composite), Table 3 shows six different oligomer brands, Table 4 shows six different monomer brands, Table 5 shows twelve different resin bead brands and Table 6 shows the brands of five different particulate silica which are an additional additive. The oligomer monomer in the composites of Table 1 and 2 were prepared by being chosen from the brands of Table 3 and 4. In case where the blends are so that the viscosity of the composites gets higher among Examples and Comparisons, butyl carbitol acetate was added as a solvent (see Examples 4, 17, 19 and 32 and Comparisons 4 and 6 in Table 4 and Tables subsequent therefrom).

TABLE 1

Ultraviole hardening resin composite A

| COMPOSITION | Ingredient and Brand name | BLEND (Weight Part) |
|---|---|---|
| Photo-polymerization oligomer | Selected from any in Table 3 | 50 |
| Photo-polymerization monomer | Selected from any in Table 3 | 50 |
| Photo-polymerization initiator | Hydroxy ketone based initiator and acylphosphine oxide based initiator mixed at a ratio of one versus one | 8 |
| Leveling agent | BYK-UV3500 manufactured by BYK, Japoan (BYK is the registered trade mark) | 0.93 |

TABLE 2

Ultraviolet hardening resin composite B

| Composition | Ingredient or Product name | Blend (Weight Part) |
|---|---|---|
| Three functional photo-polymerization monomer | Penthaerythritor triacrylate | 50 |
| Two functional photo-polymerization monomer | 1.6-Hexanediol diacrylate | 50 |
| Photo-polymerization initiator | Hydroxy ketone based initiator and acylphosphine oxide based initiator mixed at a ratio of one versus one | 7 |
| Acrylic Polymer | Weight-average molecular weight: 75000 (Solved in two functional monomer and added) | 5 |
| Leveling agent | BYK-UV3500 manufactured by BYK, Japoan (BYK is the registered trade mark) | 0.25 |

TABLE 3

Oligomers

| Mark | Photo-polymerization oligomer | Company's Name |
|---|---|---|
| Ao | SHIKOUV3000B | Nippon Gosei Chemical |
| Bo | SHIKOUV6100B | Nippon Gosei Chemical |
| Co | SHIKOUV6630B | Nippon Gosei Chemical |
| Do | SHIKOUV7510B | Nippon Gosei Chemical |
| Eo | GENOMER3611 | Rahn AG |
| Fo | EBECRYL 8210 | Daicel Cytech |

NOTE:
SHIKO(Registered Trademark) EBECRYL(Registered Trademark)

TABLE 4

| | Monomer | | |
|---|---|---|---|
| Mark | Photo-polymerization monomer | Company's Name | Ingredient |
| Am | HDDA | Daicel Cytech | 1.6-hexandiol diacrylate |
| Bm | TMPEOTA | Daicel Cytech | Trimethylolpropane ethoxytriacrylate |
| Cm | PETIA | Daicel Cytech | Pentaerythritol triacrylate |
| Dm | β-CEA | Daicel Cytech | β-carboxyethyl acrylate |
| Em | EBECRYL40 | Daicel Cytech | Pentaerythritol ethoxytetraacrylate |
| Fm | TMPTA | Daicel Cytech | Trimethylolpropane triacrylate |

NOTE:
EBECRYL(Registered Trademark)

TABLE 5

| Mark | Resin beads (brand) | Company's name | Materiaal |
|---|---|---|---|
| Ab | Art Pearl C-400 | NEGAMI CHEMICAL INDUSTRIAL CO., LTD. | Polyurethane |
| Bb | Art Pearl C-800 | NEGAMI CHEMICAL INDUSTRIAL CO., LTD. | Polyurethane |
| Cb | Art Pearl C-200 | NEGAMI CHEMICAL INDUSTRIAL CO., LTD. | Polyurethane |
| Db | Art Pearl P-400T | NEGAMI CHEMICAL INDUSTRIAL CO., LTD. | Polyurethane |
| Eb | Art Pearl CE-400T | NEGAMI CHEMICAL INDUSTRIAL CO., LTD. | Polyurethane |
| Fb | Art Pearl C-100 | NEGAMI CHEMICAL INDUSTRIAL CO., LTD. | Polyurethane |
| Gb | Art Pearl JB-400T | NEGAMI CHEMICAL INDUSTRIAL CO., LTD. | Polyurethane |
| Hb | Art Pearl CF-600T | NEGAMI CHEMICAL INDUSTRIAL CO., LTD. | Polyurethane having surface OH group treated |
| Ib | Art Pearl MM-120TW | NEGAMI CHEMICAL INDUSTRIAL CO., LTD. | Polyurethane |
| Jb | Mel Tex LA (15 micrometers) | SANYO CHEMICAL INDUSTRIES LTD. | Polyurethane |
| Kb | Art Pearl GR400 | NEGAMI CHEMICAL INDUSTRIAL CO., LTD | Acryl |
| Lb | Mel Tex LA (60 micrometers) | SANYO CHEMICAL INDUSTRIES LTD. | Polyurethane |

NOTE::
Art Pearl and Mel Tex are registered Trademarks

TABLE 6

| Mark | Particulaate silica (brand) | Company's name | Surface traetment |
|---|---|---|---|
| As | AEROSIL R816 | NIPPON AEROSIL CO., LTD. | Octyl silane |
| Bs | REOLOSIL HM-3OS | TOKUYAMA CORPORATION | Hexyamethyl-disilane |
| Cs | TS-382 | Cabot Corporation | Octyl silane |
| Ds | Hyprecica SQ (10 micrometers) | UBE NITTO KASEI CO., LTD. | Dimethyl chlorosilaane |
| Es | Hyprecica TS (12 micrometers) | UBE NITTO KASEI CO., LTD. | Dimethyl chlorosilaane |

NOTE:
AEROSI, REOLOSIL and HYPRECICA are registered trademarks

Although shown in Tables 1 through 6, in Examples 20 through 23, 33, 35 and 36 was added DURANATE (Registered trademark) TPA-100 manufactured by AsahiKasei Chemicals, Japan as isocyanate ingredient, the additional additive (B). In Examples 33, 35 and 36 was added DURANOL (Registered trademark) T5652 (polycarbonate diol) manufactured by Asahi Kasei Chemicals, Japan as polyol, the additional additive (B) in addition to the isocyanate. In Example 43 was added BOLTORN (Registered trademark) H2004 (polyester polyol dendrimer compound) manufactured by Perstorp which was the branch-type polyol of 6 functional groups (the number of hydroxyl groups is 6) as the polyol and in Example 44 was added BOLTORN (Registered trademark) H20 (polyester polyol dendrimer compound) manufactured by Perstorp which was the branch-type polyol of 16 functional groups (the number of hydroxyl groups is 16) as the polyol. In Examples 37 through 39 was added X22-1602 manufactured by Shin-Etsu Chemical Co., Ltd. as a reactive silicone based ingredient which was an additive (C).

TABLE 7

| | | | | Example1 | Example 2 | Example 3 | Example 4 | Example 5 |
|---|---|---|---|---|---|---|---|---|
| Main ingredient | UV Hardening resin composite | Amount of blend | Kind Weight parts | A 100 | A 100 | A 100 | A 100 | A 100 |
| | Photo-polymerization monomer | Product or ingredient Number of functional group Volume shrinkage coefficient | % | Am 2 19 | Am 2 19 | Am 2 19 | Am 2 19 | Am 2 19 |
| | Photo-polymerization oligomer | Product or ingredient Number of functional group Glass tansition temperature | ° C. | Ao 2 −39 | Ao 2 −39 | Ao 2 −39 | Ao 2 −39 | Ao 2 −39 |
| | Resin beads | Product Particle diameter Glass transition temperature Amount of blend | Micrometer ° C. Weight parts | Bb 6 −13 50 | Ab 15 −13 50 | Cb 32 −13 50 | Db 15 −34 50 | Eb 15 34 50 |
| Additive Ingredient | Isocyanate | Amount of blend | Weight parts | — | — | — | — | — |
| | Polyol | Amount of blend | Weight parts | — | — | — | — | — |
| | Particulate silica | Product Particle diameter Amount of blend | Mucrometer Weight parts | — — — | — — — | — — — | — — — | — — — |
| | Silicone additives | Amount of blend | Weight parts | — | — | — | — | — |
| | Solvent | Amount of blend | Weight % | — | — | — | 25 | — |
| evaluation | Coating operation property | | | ○ | ○ | ○ | Δ | ○ |
| | Softness feeling | | | ◎ | ◎ | ◎ | ◎ | ◎ |
| | Wetness feeling | | | ◎ | ◎ | ◎ | ◎ | ○ |
| | Abrasion resistance (Prevention resin beads from falling out) | | | ○ | ○ | ○ | ○ | ○ |
| | Adhesion property of decoration layer | | | ○ | ○ | ○ | ○ | ○ |

TABLE 7-continued

|  |  |  |  | Example 6 | Example 7 | Example 8 | Example 9 |
|---|---|---|---|---|---|---|---|
| Main ingredient | UV Hardening resin composite | Kind | | A | A | A | A |
| | | Amount of blend | Weight parts | 100 | 100 | 100 | 100 |
| | Photo-polymerization monomer | Product or ingredient | | Am | Am | Am | Am |
| | | Number of functional group | — | 2 | 2 | 2 | 2 |
| | | Volume shrinkage coefficient | % | 19 | 19 | 19 | 19 |
| | Photo-polymerization oligomer | Product or ingredient | | Bo | Co | Do | Fo |
| | | Number of functional group | — | 2 | 2 | 3 | 4 |
| | | Glass tansition temperature | ° C. | 0 | 38 | 17 | 68 |
| | Resin beads | Product | | Ab | Ab | Ab | Ab |
| | | Particle diameter | Micrometer | 15 | 15 | 15 | 15 |
| | | Glass tansition temperature | ° C. | −13 | −13 | −13 | −13 |
| | | Amount of blend | Weight parts | 50 | 50 | 50 | 50 |
| Additive Ingredient | Isocyanate | Amount of blend | Weight parts | — | — | — | — |
| | Polyol | Amount of blend | Weight parts | — | — | — | — |
| | Particulate silica | Product | | — | — | — | — |
| | | Particle diameter | Mucrometer | — | — | — | — |
| | | Amount of blend | Weight parts | — | — | — | — |
| | Silicone additives | Amount of blend | Weight parts | — | — | — | — |
| | Solvent | Amount of blend | Weight % | — | — | — | — |
| evaluation | Coating operation property | | | ○ | ○ | ○ | ○ |
| | Softness feeling | | | ◎ | ○ | ○ | Δ |
| | Wetness feeling | | | ◎ | ◎ | ◎ | ◎ |
| | Abrasion resistance (Prevention resin beads from falling out | | | ○ | ○ | ○ | ○ |
| | Adhesion property of decoration layer | | | ○ | ○ | ○ | ○ |

TABLE 8

|  |  |  |  | Example 10 | Example 11 | Example 12 | Example 13 | Example 14 |
|---|---|---|---|---|---|---|---|---|
| Main ingredient | UV Hardening resin composite | Kind | | A | A | A | A | A |
| | | Amount of blend | Weight parts | 100 | 100 | 100 | 100 | 100 |
| | Photo-polymerization monomer | Product or ingredient | | Am | Cm | Bm | Dm | Am |
| | | Number of functional group | — | 2 | 3 | 3 | 1 | 2 |
| | | Volume shrinkage coefficient | % | 19 | 16 | 20 | 4.2 | 19 |
| | Photo-polymerization oligomer | Product or ingredient | | Eo | Ao | Ao | Ao | Ao |
| | | Number of functional group | — | 6 | 2 | 2 | 2 | 2 |
| | | Glass tansition temperature | ° C. | 35 | −39 | −39 | −39 | −39 |
| | Resin beads | Product | | Ab | Ab | Ab | Ab | Fb |
| | | Particle diameter | Micrometer | 15 | 15 | 15 | 15 | 50 |
| | | Glass tansition temperature | ° C. | −13 | −13 | −13 | −13 | −13 |
| | | Amount of blend | Weight parts | 50 | 50 | 50 | 50 | 50 |
| Additive Ingredient | Isocyanate | Amount of blend | Weight parts | — | — | — | — | — |
| | Polyol | Amount of blend | Weight parts | — | — | — | — | — |
| | Particulate silica | Product | | — | — | — | — | — |
| | | Particle diameter | Mucrometer | — | — | — | — | — |
| | | Amount of blend | Weight parts | — | — | — | — | — |
| | Silicone additives | Amount of blend | Weight parts | — | — | — | — | — |
| | Solvent | Amount of blend | Weight % | — | — | — | — | — |
| evaluation | Coating operation property | | | ○ | ○ | ○ | ○ | ○ |
| | Softness feeling | | | Δ | Δ | ○ | ◎ | ◎ |
| | Wetness feeling | | | ◎ | ◎ | ◎ | ◎ | ◎ |
| | Abrasion resistance (Prevention resin beads from falling out | | | ○ | ○ | ○ | ○ | ○ |
| | Adhesion property of decoration layer | | | ○ | ○ | ○ | ○ | ○ |

|  |  |  |  | Example 15 | Example 16 | Example 17 | Example 18 |
|---|---|---|---|---|---|---|---|
| Main ingredient | UV Hardening resin composite | Kind | | A | A | A | A |
| | | Amount of blend | Weight parts | 100 | 100 | 100 | 100 |
| | Photo-polymerization monomer | Product or ingredient | | Am | Am | Am | Am |
| | | Number of functional group | — | 2 | 2 | 2 | 2 |
| | | Volume shrinkage coefficient | % | 19 | 19 | 19 | 19 |
| | Photo-polymerization oligomer | Product or ingredient | | Ao | Ao | Ao | Ao |
| | | Number of functional group | — | 2 | 2 | 2 | 2 |
| | | Glass tansition temperature | ° C. | −39 | −39 | −39 | −39 |
| | Resin beads | Product | | Jb | Kb | Gb | Ab |
| | | Particle diameter | Micrometer | 15 | 15 | 15 | 15 |
| | | Glass tansition temperature | ° C. | −41 | 100 | −55 | −13 |
| | | Amount of blend | Weight parts | 50 | 50 | 50 | 15 |
| Additive Ingredient | Isocyanate | Amount of blend | Weight parts | — | — | — | — |
| | Polyol | Amount of blend | Weight parts | — | — | — | — |
| | Particulate silica | Product | | — | — | — | — |
| | | Particle diameter | Mucrometer | — | — | — | — |
| | | Amount of blend | Weight parts | — | — | — | — |

TABLE 8-continued

|  |  |  |  |  |  |  |  |
|---|---|---|---|---|---|---|---|
|  | Silicone additives | Amount of blend | Weight parts | — | — | — | — |
|  | Solvent | Amount of blend | Weight % | — | — | 25 | — |
| evaluation | Coating operation property | | | X | ○ | X | ◎ |
|  | Softness feeling | | | ◎ | ○ | ◎ | ○ |
|  | Wetness feeling | | | ◎ | Δ | ◎ | Δ |
|  | Abrasion resistance (Prevention resin beads from falling out) | | | ○ | ○ | ○ | ○ |
|  | Adhesion property of decoration layer | | | ○ | ○ | ○ | ○ |

TABLE 9

|  |  |  |  | Example 19 | Example 20 | Example 21 | Example 22 | Example 23 |
|---|---|---|---|---|---|---|---|---|
| Main ingredient | UV Hardening resin composite | Kind | | A | A | A | A | A |
|  |  | Amount of blend | Weight parts | 100 | 100 | 100 | 100 | 100 |
|  | Photo-polymerization monomer | Product or ingredient | | Am | Am | Am | Am | Am |
|  |  | Number of functional group | — | 2 | 2 | 2 | 2 | 2 |
|  |  | Volume shrinkage coefficient | % | 19 | 19 | 19 | 19 | 19 |
|  | Photo-polymerization oligomer | Product or ingredient | | Ao | Ao | Bo | Co | Ao |
|  |  | Number of functional group | — | 2 | 2 | 2 | 2 | 2 |
|  |  | Glass tansition temperature | °C. | −39 | −39 | 0 | 38 | −39 |
|  | Resin beads | Product | | Ab | Hb | Hb | Hb | Hb |
|  |  | Particle diameter | Micrometer | 15 | 10 | 10 | 10 | 10 |
|  |  | Glass tansition temperature | °C. | −13 | 9 | 9 | 9 | 9 |
|  |  | Amount of blend | Weight parts | 100 | 50 | 50 | 50 | 50 |
| Additive Ingredient | Isocyanate | Amount of blend | Weight parts | — | 3.66 | 3.66 | 3.66 | 8.16 |
|  | Polyol | Amount of blend | Weight parts | — | — | — | — | 10 |
|  | Particulate silica | Product | | — | — | — | — | — |
|  |  | Particle diameter | Mucrometer | — | — | — | — | — |
|  |  | Amount of blend | Weight parts | — | — | — | — | — |
|  | Silicone additives | Amount of blend | Weight parts | — | — | — | — | — |
|  | Solvent | Amount of blend | Weight % | 50 | — | — | — | — |
| evaluation | Coating operation property | | | Δ | ○ | ○ | ○ | ○ |
|  | Softness feeling | | | ○ | ◎ | ○ | ○ | ○ |
|  | Wetness feeling | | | ◎ | ◎ | ◎ | ◎ | ◎ |
|  | Abrasion resistance (Prevention resin beads from falling out) | | | ○ | ◎ | ◎ | ◎ | ◎ |
|  | Adhesion property of decoration layer | | | ○ | ○ | ○ | ○ | ○ |

|  |  |  |  | Example 24 | Example 25 | Example 26 | Example 27 |
|---|---|---|---|---|---|---|---|
| Main ingredient | UV Hardening resin composite | Kind | | A | A | A | A |
|  |  | Amount of blend | Weight parts | 100 | 100 | 100 | 100 |
|  | Photo-polymerization monomer | Product or ingredient | | Am | Am | Am | Am |
|  |  | Number of functional group | — | 2 | 2 | 2 | 2 |
|  |  | Volume shrinkage coefficient | % | 19 | 19 | 19 | 19 |
|  | Photo-polymerization oligomer | Product or ingredient | | Ao | Ao | Ao | Ao |
|  |  | Number of functional group | — | 2 | 2 | 2 | 2 |
|  |  | Glass tansition temperature | °C. | −39 | −39 | −39 | −39 |
|  | Resin beads | Product | | Ab | Ab | Ab | Ab |
|  |  | Particle diameter | Micrometer | 15 | 15 | 15 | 15 |
|  |  | Glass tansition temperature | °C. | −13 | −13 | −13 | −13 |
|  |  | Amount of blend | Weight parts | 15 | 15 | 15 | 15 |
| Additive Ingredient | Isocyanate | Amount of blend | Weight parts | — | — | — | — |
|  | Polyol | Amount of blend | Weight parts | — | — | — | — |
|  | Particulate silica | Product | | Bs | As | Ds | Es |
|  |  | Particle diameter | Mucrometer | 0.007 | 0.012 | 10 | 12 |
|  |  | Amount of blend | Weight parts | 30 | 30 | 30 | 30 |
|  | Silicone additives | Amount of blend | Weight parts | — | — | — | — |
|  | Solvent | Amount of blend | Weight % | — | — | — | — |
| evaluation | Coating operation property | | | Δ | ○ | ○ | ○ |
|  | Softness feeling | | | ◎ | ◎ | ◎ | Δ |
|  | Wetness feeling | | | ◎ | ◎ | ◎ | ○ |
|  | Abrasion resistance (Prevention resin beads from falling out) | | | ○ | ○ | ○ | ○ |
|  | Adhesion property of decoration layer | | | ○ | ○ | ○ | ○ |

TABLE 10

|  |  |  |  | Example 28 | Example 29 | Example 30 | Example 31 | Example 32 |
|---|---|---|---|---|---|---|---|---|
| Main ingredient | UV Hardening resin composite | Kind | | A | A | A | A | A |
| | | Amount of blend | Weight parts | 100 | 100 | 100 | 100 | 100 |
| | Photo-polymerization monomer | Product or ingredient | | Am | Am | Am | Am | Am |
| | | Number of functional group | — | 2 | 2 | 2 | 2 | 2 |
| | | Volume shrinkage coefficient | % | 19 | 19 | 19 | 19 | 19 |
| | Photo-polymerization oligomer | Product or ingredient | | Ao | Ao | Ao | Ao | Ao |
| | | Number of functional group | — | 2 | 2 | 2 | 2 | 2 |
| | | Glass tansition temperature | °C. | −39 | −39 | −39 | −39 | −39 |
| | Resin beads | Product | | Ab | Ab | Ab | Ab | Ab |
| | | Particle diameter | Micrometer | 15 | 15 | 15 | 15 | 15 |
| | | Glass tansition temperature | °C. | −13 | −13 | −13 | −13 | −13 |
| | | Amount of blend | Weight parts | 15 | 15 | 15 | 15 | 15 |
| Additive Ingredient | Isocyanate | Amount of blend | Weight parts | — | — | — | — | — |
| | Polyol | Amount of blend | Weight parts | — | — | — | — | — |
| | Particulate silica | Product | | Cs | As | As | As | As |
| | | Particle diameter | Mucrometer | 0.2 | 0.012 | 0.012 | 0.012 | 0.012 |
| | | Amount of blend | Weight parts | 30 | 12.5 | 37.5 | 10 | 40 |
| | Silicone additives | Amount of blend | Weight parts | — | — | — | — | — |
| | Solvent | Amount of blend | Weight % | — | — | 25 | — | 25 |
| evaluation | Coating operation property | | | ○ | ○ | ○ | ○ | △ |
| | Softness feeling | | | ◎ | ◎ | ◎ | △ | △ |
| | Wetness feeling | | | ◎ | ◎ | ◎ | ○ | ○ |
| | Abrasion resistance (Prevention resin beads from falling out | | | ○ | ○ | ○ | ○ | ○ |
| | Adhesion property of decoration layer | | | ○ | ○ | ○ | ○ | ○ |

|  |  |  |  | Example 33 | Example 34 | Example 35 | Example 36 |
|---|---|---|---|---|---|---|---|
| Main ingredient | UV Hardening resin composite | Kind | | A | B | B | B |
| | | Amount of blend | Weight parts | 100 | 100 | 100 | 100 |
| | Photo-polymerization monomer | Product or ingredient | | Am | Am | Am | Am |
| | | Number of functional group | — | 2 | 2 | 2 | 2 |
| | | Volume shrinkage coefficient | % | 19 | 19 | 19 | 19 |
| | Photo-polymerization oligomer | Product or ingredient | | Ao | — | — | — |
| | | Number of functional group | — | 2 | — | — | — |
| | | Glass tansition temperature | °C. | −39 | — | — | — |
| | Resin beads | Product | | Hb | Ab | Hb | Hb |
| | | Particle diameter | Micrometer | 10 | 15 | 10 | 10 |
| | | Glass tansition temperature | °C. | 9 | −13 | 9 | 9 |
| | | Amount of blend | Weight parts | 15 | 50 | 50 | 15 |
| Additive Ingredient | Isocyanate | Amount of blend | Weight parts | 8.16 | — | 8.16 | 8.16 |
| | Polyol | Amount of blend | Weight parts | 10 | — | 10 | 10 |
| | Particulate silica | Product | | As | — | — | As |
| | | Particle diameter | Mucrometer | 0.012 | — | — | 0.012 |
| | | Amount of blend | Weight parts | 30 | — | — | 30 |
| | Silicone additives | Amount of blend | Weight parts | — | — | — | — |
| | Solvent | Amount of blend | Weight % | — | — | — | — |
| evaluation | Coating operation property | | | ○ | ○ | ○ | ○ |
| | Softness feeling | | | ◎ | ○ | ○ | ○ |
| | Wetness feeling | | | ◎ | ◎ | ◎ | ◎ |
| | Abrasion resistance (Prevention resin beads from falling out | | | ◎ | ○ | ◎ | ◎ |
| | Adhesion property of decoration layer | | | ○ | ○ | ○ | ○ |

TABLE 11

|  |  |  |  | Example 37 | Example 38 | Example 39 | Example 40 |
|---|---|---|---|---|---|---|---|
| Main ingredient | UV Hardening resin composite | Kind | | A | A | A | A |
| | | Amount of blend | Weight parts | 100 | 100 | 100 | 101 |
| | Photo-polymerization monomer | Product or ingredient | | Am | Am | Am | Am |
| | | Number of functional group | — | 2 | 2 | 2 | 2 |
| | | Volume shrinkage coefficient | % | 19 | 19 | 19 | 19 |
| | Photo-polymerization oligomer | Product or ingredient | | Ao | Ao | Ao | Ao |
| | | Number of functional group | — | 2 | 2 | 2 | 2 |
| | | Glass tansition temperature | °C. | −39 | −39 | −39 | −39 |
| | Resin beads | Product | | Ab | Ab | Ab | Ab |
| | | Particle diameter | Micrometer | 15 | 15 | 15 | 15 |
| | | Glass tansition temperature | °C. | −13 | −13 | −13 | −13 |
| | | Amount of blend | Weight parts | 50 | 50 | 50 | 50 |
| Additive Ingredient | Isocyanate | Amount of blend | Weight parts | — | — | — | — |
| | Polyol | Amount of blend | Weight parts | — | — | — | — |
| | Particulate silica | Product | | — | — | — | — |
| | | Particle diameter | Mucrometer | — | — | — | — |
| | | Amount of blend | Weight parts | — | — | — | — |

TABLE 11-continued

|  |  |  |  |  |  |  |  |
|---|---|---|---|---|---|---|---|
|  | Silicone additives | Amount of blend | Weight parts | 0.1 | 5 | 15 | 20 |
|  | Solvent | Amount of blend | Weight % | — | — | — | — |
| evaluation | Coating operation property |  |  | ◯ | ◯ | ◯ | ◯ |
|  | Softness feeling |  |  | ◎ | ◎ | ◎ | ◎ |
|  | Wetness feeling |  |  | ◎ | ◎ | ◎ | ◎ |
|  | Abrasion resistance (Prevention resin beads from falling out) |  |  | ◯ | ◎ | ◎ | ◯ |
|  | Adhesion property of decoration layer |  |  | ◯ | ◯ | ◯ | ◯ |

|  |  |  |  | Example 41 | Example 42 | Example 43 | Example 44 |
|---|---|---|---|---|---|---|---|
| Main ingredient | UV Hardening resin composite | Kind |  | Separated liquid component of Example 2 | Separated liquid component of Example 34 | A | A |
|  |  | Amount of blend | Weight parts |  |  | 100 | 100 |
|  | Photo-polymerization monomer | Product or ingredient |  |  |  | Am | Am |
|  |  | Number of functional group | — |  |  | 2 | 2 |
|  |  | Volume shrinkage coefficient | % |  |  | 19 | 19 |
|  | Photo-polymerization oligomer | Product or ingredient |  |  |  | Ao | Ao |
|  |  | Number of functional group | — |  |  | 2 | 2 |
|  |  | Glass tansition temperature | ° C. |  |  | −39 | −39 |
|  | Resin beads | Product |  |  |  | Hb | Hb |
|  |  | Particle diameter | Micrometer |  |  | 10 | 10 |
|  |  | Glass tansition temperature | ° C. |  |  | 9 | 9 |
|  |  | Amount of blend | Weight parts |  |  | 50 | 50 |
| Additive Ingredient | Isocyanate | Amount of blend | Weight parts |  |  | 8.16 | 8.16 |
|  | Polyol | Amount of blend | Weight parts |  |  | 10 | 10 |
|  | Particulate silica | Product |  |  |  | — | — |
|  |  | Particle diameter | Mucrometer |  |  | — | — |
|  |  | Amount of blend | Weight parts |  |  | — | — |
|  | Silicone additives | Amount of blend | Weight parts |  |  | — | — |
|  | Solvent | Amount of blend | Weight % |  |  | — | — |
| evaluation | Coating operation property |  |  | ◯ | ◯ | ◯ | ◯ |
|  | Softness feeling |  |  | ◎ | ◯ | ◯ | ◯ |
|  | Wetness feeling |  |  | ◎ | ◎ | ◎ | ◎ |
|  | Abrasion resistance (Prevention resin beads from falling out) |  |  | ◯ | ◯ | ◎ | ◎ |
|  | Adhesion property of decoration layer |  |  | ◯ | ◯ | ◯ | ◯ |

TABLE 12

|  |  |  |  | Comparison 1 | Comparison 2 | Comparison 3 |
|---|---|---|---|---|---|---|
| Main ingredient | UV Hardening resin composite | Kind |  | A | A | A |
|  |  | Amount of blend | Weight parts | 100 | 100 | 100 |
|  | Photo-polymerization monomer | Product or ingredient |  | Em | Fm | Am |
|  |  | Number of functional group | — | 4 | 3 | 2 |
|  |  | Volume shrinkage coefficient | % | 8.7 | 25.1 | 19 |
|  | Photo-polymerization oligomer | Product or ingredient |  | Ao | Ao | Ao |
|  |  | Number of functional group | — | 2 | 2 | 2 |
|  |  | Glass tansition temperature | ° C. | −39 | −39 | −39 |
|  | Resin beads | Product |  | Ab | Ab | Ab |
|  |  | Particle diameter | Micrometer | 15 | 15 | 15 |
|  |  | Glass tansition temperature | ° C. | −13 | −13 | −13 |
|  |  | Amount of blend | Weight parts | 80 | 80 | 10 |
| Additive Ingredient | Isocyanate | Amount of blend | Weight parts | — | — | — |
|  | Polyol | Amount of blend | Weight parts | — | — | — |
|  | Particulate silica | Product |  | — | — | — |
|  |  | Particle diameter | Mucrometer | — | — | — |
|  |  | Amount of blend | Weight parts | — | — | — |
|  | Silicone additives | Amount of blend | Weight parts | — | — | — |
|  | Solvent | Amount of blend | Weight % | — | — | — |
| evaluation | Coating operation property |  |  | ◯ | ◯ | ◎ |
|  | Softness feeling |  |  | X | X | ◎ |
|  | Wetness feeling |  |  | X | X | X |
|  | Abrasion resistance (Prevention resin beads from falling out) |  |  | ◯ | ◯ | ◯ |
|  | Adhesion property of decoration layer |  |  | ◯ | ◯ | ◯ |

|  |  |  |  | Comparison 4 | Comparison 5 | Comparison 6 |
|---|---|---|---|---|---|---|
| Main ingredient | UV Hardening resin composite | Kind |  | A | A | A |
|  |  | Amount of blend | Weight parts | 100 | 100 | 100 |
|  | Photo-polymerization monomer | Product or ingredient |  | Am | Am | Am |
|  |  | Number of functional group | — | 2 | 2 | 2 |
|  |  | Volume shrinkage coefficient | % | 19 | 19 | 19 |
|  | Photo-polymerization oligomer | Product or ingredient |  | Ao | Ao | Ao |
|  |  | Number of functional group | — | 2 | 2 | 2 |
|  |  | Glass tansition temperature | ° C. | −39 | −39 | −39 |

TABLE 12-continued

|  |  |  |  | Ab | Ib | Lb |
|---|---|---|---|---|---|---|
|  | Resin beads | Product |  |  |  |  |
|  |  | Particle diameter | Micrometer | 15 | 2 | 60 |
|  |  | Glass tansition temperature | ° C. | −13 | 34 | −41 |
|  |  | Amount of blend | Weight parts | 120 | 80 | 80 |
| Additive | Isocyanate | Amount of blend | Weight parts | — | — | — |
| Ingredient | Polyol | Amount of blend | Weight parts | — | — | — |
|  | Particulate silica | Product |  | — | — | — |
|  |  | Particle diameter | Mucrometer | — | — | — |
|  |  | Amount of blend | Weight parts | — | — | — |
|  | Silicone additives | Amount of blend | Weight parts | — | — | — |
|  | Solvent | Amount of blend | Weight % | 50 | — | 25 |
| evaluation | Coating operation property |  |  | X | X | ○ |
|  | Softness feeling |  |  | ◉ | ◉ | ◉ |
|  | Wetness feeling |  |  | X | X | X |
|  | Abrasion resistance (Prevention resin beads from falling out) |  |  | ○ | ○ | ○ |
|  | Adhesion property of decoration layer |  |  | X | ○ | ○ |

Tables 7 through 11 show the evaluation of the main ingredients and the additive ingredients of the coating agent according to Examples of the invention and Table 12 shows the evaluation of the main ingredients and the additive ingredients of the coating agent according to Comparisons. "Evaluation" contains the efficiency of the coating operation, the softness feeling, the wetness feeling and the abrasion resistance (the effect of prevention of the resin beads from falling out) of the decoration layer of the article obtained by carrying out the water pressure transfer using the coating agent and the adhesion of the decoration layer to the surface of the article. The coating agents of Examples 34 through 36 among Examples of the invention had the monomer based (no oligomer contained) ultraviolet hardening resin B used and the coating agent of the other Examples 1 through 33 had the oligomer/monomer based ultraviolet hardening resin composite A of oligomer/monomer used. As noted from Tables 7 through 11, even in two Example groups using the same ultraviolet hardening resin composites A and B, the component (the photo-polymerization oligomer and/or the photo-polymerization monomer) of the ultraviolet hardening resin composites A and B and the component, the particle diameter, the glass transition temperature and the blend amount of the resin beads variously changed for every Example within the specified limits of the invention. Although the coating agents of Examples 1 through 19 had no additional additive, the coating agents of Examples 20 through 36 and Examples 43 and 44 had one or both of the additives A (abrasion resistance improvement agent) and B (resin bead collection agent) added thereto and the coating agents of Examples 37 through 39 had the additive C (reactive silicone based ingredient) added thereto. Examples 41 and 42 are of the form where Examples 2 and 34 were modified so that the first liquid component containing the component excluding the resin beads and the second liquid component where the mineral spirit of 50 weight % relative to the weight of the resin beads and the resin beads are mixed and distributed were separated from each other. In these Examples, the first and second liquid components were mixed and diffused to form the coating agent. On the other hand, although all Comparisons used the oligomer/monomer based ultraviolet hardening resin composite, either of the conditions such as the ingredient (photo-polymerization oligomer and/or photo-polymerization monomer) of the ultraviolet hardening resin composite A and the ingredient, the particle diameter, the glass transition temperature and the blend amount of the resin beads variously changed for every Comparison falling outside the specific conditions of the invention. In these Examples, the particle diameter of the resin beads was the value (medium diameter: D50) measured and equalized by the laser diffraction type particle size distribution measurement device (Shimadzu SALD-2000J) according to the laser diffracting method of JIS Z8825-1 and the particle diameter of the particulate silica was the value measured using TEM (manufactured by Hitachi High-Tech Company H-8100).

The water pressure transfer was performed by the method as described below using the coating agents of Examples 1 through 44 and Comparisons 1 through 6.

(i) Transfer Film

There was used the transfer film of grain patterns being sold by Taica Corporation, the applicant to the licensees of water pressure transfer art under the brand name called a "MOON MACASSER×PIQUE).

(ii) Application (Coating Operation) of the Coating Agent

The coating agent was applied to the transfer film of (i) by the wire bar coating method to the thickness of 10 micrometers.

(iii) Object to be pattern-transferred

The article, the object to be pattern-transferred used was a plain board made of ABS resin of 10cm×20cm×3mm ABS resin (TM 20 made by MG ABS, Inc.) and the water pressure transfer was carried out on the article in the order of the steps shown in FIG. 2.

Each item of the Evaluations of Table 7-11 was set up as follows.

(1) Coating Operation Property

When each of the activating agents was applied to the thickness of about 20 micrometers on the print pattern of the transfer film by the wire bar method just before introducing the transfer film in the transfer tub, the case where the coating operation property (the easiness of the coating operation) was good is indicated by the symbol "○" (a single circle), the case the coating operation property was inferior, but the coating operation was possible within the range of practical use is indicated by the symbol "Δ" (a triangle) and the operation of coating on the transfer film was difficult is indicated by the symbol "X".

(2) Softness Feeling

A water pressure transfer article (a blank article) having the decoration layer of no softness feeling formed by carrying out the water pressure transfer on the object to be pattern-transferred using the operation conditions and the transfer film identical to that of Examples, but using the coating agent (conventional coating agent) comprising the non-solvent type ultraviolet hardening resin composite called the brand name "UBIC S CLEAR HE" manufactured by OHASHI CHEMICAL INDUSTRIES CO., LTD. in place of the coating agents of Examples of the invention was determined to be 0 point while the article having a soft layer formed directly on the surface of the article by applying a commercially available softness feeling imparting agent (the brand name "HONNEY SOFT" manufactured by HONNEY CHEMICALS, CO., LTD.) on the surface of the object identical to that of Examples to the thickness of 25 micrometers and drying the same was determined to be 10 points. The softness feeling felt by ten test subjects having touched each of the samples (here and hereinafter, the water pressure transfer article according to Examples and Comparisons) was expressed by the number of points. Ten persons' average mark (the value below the decimal point deleted) of 6 through 10 was expressed by the symbol "⊚" (a double circle), that of 5 through 3 was expressed by the symbol "○" (the single circle), that of 2 and 1 was expressed by the symbol "Δ" (the triangle) and that of 0 was expressed by the symbol "X."

(3) Wetness Feeling

Similarly, a water pressure transfer article (a blank article) having the decoration layer of no wetness feeling formed by carrying out the water pressure transfer on the object to be pattern-transferred using the operation conditions and the transfer film identical to that of Examples, but using the coating agent (conventional coating agent) comprising the non-solvent type ultraviolet hardening resin composite called the brand name "UBIC S CLEAR HE" manufactured by OHASHI CHEMICAL INDUSTRIES CO., LTD. in place of the coating agents of Examples of the invention was determined to be 0 point while the article having a wet layer formed directly on the surface of the article by applying a commercially available wetness feeling imparting agent (the brand name "RUBFLEX" manufactured by HONNEY CHEMICALS, CO., LTD.) on the surface of the object identical to that of Examples to the thickness of 25 micrometers and drying the same was determined to be 10 points. The wetness feeling felt by ten test subjects having touched each of the samples (here and hereinafter, the water pressure transfer article according to Examples and Comparisons) was expressed by the number of points. Ten persons' average mark (the value below the decimal point deleted) of 6 through 10 was expressed by the symbol "⊚" (the double circle), that of 5 through 3 was expressed by the symbol "○" (the single circle), that of 2 and 1 was expressed by the symbol "Δ" (the triangle) and that of 0 was expressed by the symbol "X."

(4) Abrasion Resistance

There was carried out a Taber abrasion test using the Tabor abrasion test machine manufactured by TESTER INDUSTRIAL CO., LTD. under the conditions of the wear ring of CS-10, the load of 4.9N and the revolution of 60 rpm. and the surface of each sample at the end of 100 revolutions and at the end of 200 revolutions were observed using a microscope (200 times). The case where the resin beads never fell out even at the end of 200 revolutions was expressed by the evaluation symbol "⊚", the case where the resin beads fell out at the end of 200 revolutions, but never fell out at the end of 100 revolutions was expressed by the evaluation symbol "○" and the case where the resin beads fell out at the end of 100 revolutions was expressed by the evaluation symbol "X".

(5) Adhesion Property

Regarding each of the water pressure transfer articles (samples) of Examples and Comparisons, the adhesion property was evaluated by observing the removal state according to a crosscut test (based on Old JIS K5400-8.5) by using "Cellotape" (Registered trademark) (manufactured by NICHIBAN CO., LTD.). The case where there were not observed the removal of the decoration layers of any water pressure transfer articles is expressed by the evaluation symbol "○" (the single circle) and the case where there was observed the removal of the decoration layer is expressed by the evaluation symbol "X".

The evaluations will be explained below while contrasting Examples of the invention with Comparisons.

(1) From the evaluations of Examples 1 to 3 and 14 and Comparisons 5 and 6, it will be noted that the good softness feeling and wetness feeling can be obtained within the range of the particle diameter of the resin beads according to the invention.

(2) From the contrast of the evaluations of Examples 1 to 16 and 18 to 36, which excludes Example 17 with the evaluation of Example 17, more particularly, from the contrast between the evaluations of Examples 2 to 5, 15 and 16 using the same ingredients as those of Example 17 and the evaluation of Example 17, it will be noted that the desirable effect of imparting the softness feeling can be obtained within −50 to 100° C. of the glass transition temperature of the resin beads and especially from the contrast between the evaluations of Examples 2, 4 and 5 and the evaluations of Examples 16 and 17, it will be noted that the more desirable effect of the softness and wetness feelings can be obtained by using the polyurethane beads of the range of −50 to 100° C. of the glass transition temperature. In Table 8, although both of the results of the coating operation property evaluation of Examples 15 and 17 are expressed by "X", it has been confirmed that the coating operation property of Example 17 was remarkably poorer than that of Example 15. This is because the viscosity of the ultraviolet hardening resin composite coating agent was heightened due to the larger oil absorption of the resin beads in the ultraviolet hardening resin composite coating agent before hardening with the glass transition temperature of the resin beads being less than −50° C.

(3) From the contrast between the evaluations of Examples 1 to 8 and 10 to 33 excluding Example 9 and the evaluation of Example 9 and more particularly from the contrast between the evaluations of Examples 7 and 9, it will be noted that the imparting the softness feeling could be more effectively accomplished by the glass transition temperature of the oligomer of 40° C. or less.

(4) From the contrast of the evaluations between Examples other than Examples 9 and 10 and Examples 9 and 10, it will be noted that the softness feeling was better with the lower number of the functional groups of the oligomer, but with the number of functional groups of the oligomer of ten or less as in Examples 9 and 10, it would have no practical problem even though the softness feeling was slightly lowered.

(5) From the evaluation of Examples 2 and 11 and Comparison 1, it will be noted that the number of functional groups of the monomer was three or less could obtain the desirable tactile feeling (the softness feeling and the wetness feeling).

(6) From the contrast of the evaluation between Examples 1 through 33 and Comparison 2, especially from that between Example 12 and Comparison 2, it will be noted that the volume shrinkage coefficient of the monomer was preferably 20% or less, but the volume shrinkage coefficient was preferably smaller and 0% was an ideal value.

(7) From the contrast of the evaluation between Examples 1 through 39 and Comparisons 3 and 4, it will be noted that the amount of addition of the resin beads was preferably 15 through 100 weight part relative to 100 weight part of the ultraviolet hardening resin composite.

(8) From the contrast of the evaluation between Examples 1 through 19 and Examples 20 through 22, it will be noted that the resin beads were effectively prevented from falling out by combining the resin beads having OH group on the surface thereof with isocyanate whereby the abrasion resistance was improved.

(9) It will be noted that the abrasion resistance was effectively improved even if the polyol was added as in Example 23 in the same manner as in Examples 20 through 22. Also, the branch type polyol could effectively improve the abrasion resistance, which will be noted from the evaluation of the abrasion resistance in both of Example 43 having six functional branch type polyol added in place of the polyol of Example 23 and Example 44 having 16 functional branch-type polyol added were the evaluation of "⊚" (the double circle) like Example 23. Although not shown in Tables 9 and 11, the falling out of the resin beads was observed in Examples 23 and 43 in case where the number of revolution in the abrasion resistance test was 400, but the falling out of the resin beads was not observed in Example 44. Thus, it will be noted from this that the abrasion resistance could be effectively improved as the number of branches and functional groups of the branch type polyol increases.

(10) It will be noted that with the particulate silica added to the ingredient of Example 18 as the base material, the excellent softness and wetness feelings could be obtained even if the amount of addition of the resin beads was reduced (refer to the contrast between Example 18 and Examples 24 through 32).

(11) From the contrast between Examples 26 and 27, with the particle diameter of the particulate silica exceeding 10 micrometers, it will be noted that the softness feeling and the wetness feeling undesirably decrease. On the other hand, from the evaluation of Example 24, it will be noted that even the particle diameter of existing 0.007 micrometers of the particulate silica could obtain the coating operation property having no practical problem while maintaining the preferable tactile feeling. It is guessed that the 0.005 micrometer of the particle diameter of the particulate silica was a lower limit and the value less than the lower limit would have a problem of practical use. From the evaluations of the softness feeling and the wetness feeling in Examples 24 through 30 and Examples 31 and 32, it will be noted that the desirable amount of addition of the particulate silica is 12.5 through 37.5 weight part relative to 100 weight part of the resin beads.

(12) It will be noted from the contrast between Example 25 and 33 that, with the OH processed isocyanate used like Example 33, there could be obtained the abrasion resistance effect by the combination of the hydroxyl group processed resin beads and isocyanate even in the particulate silica addition based agent.

(13) It will be noted from the contrast between Examples 2, 23 and 33 and Examples 34, 35 and 36 that, if the same other ingredients were used, either of the oligomer/monomer based ultraviolet hardening resin composite (A) and the monomer based ultraviolet hardenability resin (B) could obtain the same effect.

(14) In Comparisons, with the number of functional groups of the photo-polymerization monomer exceeding 3 (Comparison 1), the volume shrinkage coefficient exceeding 20% (Comparison 2), the blend ratio of the resin beads being less than 15 weight part or exceeding 100 weight part relative to 100 weight part of the resin composite (Comparison 3) or (Comparison 4), any one of the evaluations is worse and therefore those Comparisons could not obtain the evaluations expected by the invention.

(15) Comparing Example 2 with Examples 37 through 39, it will be noted that, with the reactive silicone ingredient added to the same other ingredients as in Examples 37 through 39, the surface slippage characteristics would be improved and an improvement on the abrasion resistance was found. The results of the evaluation of the softness and wetness feelings in these Examples were the same as each other, but the softness and wetness feelings in Examples 37 through 39 were better.

(16) Comparing Examples 39 and 40 having the amount of addition of the reactive silicone ingredient different from each other, both of the evaluation results of the adhesion property of Table 11 are "○", but in case where the nail was put up and tried to tear off the decoration layer after the crossing cut test, the decoration layer tended to be more easily torn off in Example 40 having the higher amount of addition of the reactive silicone ingredient more than in Example 39 having the; lower amount of addition of the reactive silicone ingredient. Since the superfluous addition of the reactive silicone ingredient tends to lower the adhesion property of the decoration layer of the water pressure transfer article, the superfluous addition should be avoided and it will be noted that the amount of addition of the reactive silicone ingredient is preferably 15 or less weight part relative to 100 weight part of the ultraviolet hardening resin composite.

(17) Comparing Examples 41 and 42 with Examples 2 and 34, respectively, it will be noted that even the case where the coating agent was stored in the state of two liquid components with the resin beads of the second liquid components, the first and second liquid components were mixed when used to prepare the coating agent (Examples 41 and 42) could obtain the same operation effect as the case where the coating agent was not in the state of two liquid components (Examples 2 and 34). Comparing the coating operation property of the coating agent of Examples 2 and 34 and the coating agent of Examples 41 and 42 prepared by mixing the first and second liquid components of the two liquid component liquefaction when used, after they were stored within an airtight container while kept as they were for 6 weeks at temperature of 50° C. when they were coated to the transfer films, respectively, the coating agents of Examples 2 and 34 having no two liquid component liquefaction were observed to have the viscosity slightly higher than that of the coating agents of Examples 41 and 42 having the two liquid component liquefaction for storage, which was not shown in Table 11. Thus, it will be noted that the state of storage by the two liquid component liquefaction is effective because the coating agent can have the stable characteristic maintained.

INDUSTRIAL APPLICABILITY

The coating agent of the invention has the ultraviolet hardening resin composite as the main ingredient is applied to the print pattern of the transfer film to activate the print pattern and permeates into the whole print pattern to impart the chemical and mechanical surface protection function to the produced decoration layer. The photo-polymerization monomer of the ultraviolet hardening resin composite has the functional group of 1 or more and the volume shrinkage coefficient of 20% or less and the photo-polymerization oligomer has ten or less functional group. The coating agent contains polyurethane beads of an average particle diameter of 5 through 50 micrometers, the ultraviolet hardening resin composite and the polyurethane beads are blended at 100 weight part versus 15 through 100 weight part whereby the tactile feeling such as the softness feeling and the wetness feeling can be imparted to the decoration layer without any topcoat and without any multi-layer of the transfer film by the surface evenness and the proper volume shrinkage coefficient of the photo-polymerization monomer obtained by the predetermined average particle diameter of the polyurethane beads and therefore the invention has the higher industrial applicability.

EXPLANATION OF REFERENCE NUMERAL

10 Article
12 Decorated article
20 Transfer film
30 Water-soluble film (Carrier Film)
40 Print pattern
44 Decoration Layer
46 Ultraviolet hardening resin composite mixed print pattern (Unification Layer)
50 Water
60 Coating agent (Activating agent)
62 Ultraviolet hardening resin composite
62B Resin beads
70 Ultraviolet ray
72 Shower
74 Hot wind
80 Silicone ingredient molecule chain
81 Silicone molecular reaction part
F finger

The invention claimed is:

1. A water pressure transfer method comprising the steps of applying an ultraviolet hardening resin composite coating agent containing a photo-polymerization ingredient having at least a photo-polymerization monomer and a photo-polymerization initiator on a print pattern of a water pressure transfer film having said print pattern dried on a water-soluble film to recover an adhesion of said print pattern by said activation ingredient of said ultraviolet hardening resin composite and transferring said print pattern on a surface of an article under water pressure to form a decoration layer on the surface of said article and to form an integral layer having said print pattern and said ultraviolet hardening resin composite coating agent intermingled with said ultraviolet hardening resin composite coating agent permeated into the whole print pattern, said decoration layer formed by said integral layer whereby a chemical and physical surface protection function is imparted to said decoration layer itself by said ultraviolet hardening of said decoration layer, characterized in that said photo-polymerization monomer of said ultraviolet hardening resin composite of said coating agent has 3 or less functional groups and a volume shrinkage coefficient of 20% or less, said coating agent contains resin beads having an average particle diameter of 5 through 50 micrometer and said ultraviolet hardening resin composite and said resin beads are blended at 100 weight part versus 15 to 100 weight part.

2. A water pressure transfer method as set forth in claim 1 and characterized by said photo-polymerization ingredient containing a photo-polymerization oligomer having ten or less functional groups.

3. A water pressure transfer method as set forth in claim 2 and characterized by said photo-polymerization oligomer having a glass transition temperature Tg of 40° C. or less.

4. A water pressure transfer method as set forth in claim 1 and characterized by said resin beads having a glass transition temperature of −50 through 100° C. (measured based on JIS K7121).

5. A water pressure transfer method as set forth in claim 1 and characterized by said resin beads having an end of hydroxyl group (OH group) bonded on the surface and said ultraviolet hardening resin composite containing an ingredient having an isocyanate group.

6. A water pressure transfer method as set forth claim 1 and characterized by said coating agent further containing a particulate silica having an average particle diameter of 0.005 through 10 micrometers and said particulate silica being blended at a blend ratio of 12.5 to 37.5 weight part relative to 100 weight part of the resin beads.

7. A water pressure transfer method as set forth in claim 1 and characterized by said resin beads being polyurethane beads and having a glass transition temperature of −50 through 50° C. (measured based on JIS K7121).

8. A water pressure transfer method as set forth in claim 1 and characterized by said coating agent further containing a reactive silicone based ingredient.

9. A water pressure transfer method as set forth in claim 1 and characterized by said coating agent further containing a polyol.

10. A water pressure transfer article characterized by having a decoration layer produced by claim 1.

11. A coating agent for a water pressure transfer film used for a water pressure transfer method comprising the steps of applying an ultraviolet hardening resin composite coating agent containing a photo-polymerization ingredient having at least a photo-polymerization monomer and a photo-polymerization initiator on a print pattern of a water pressure transfer film having said print pattern dried on a water-soluble film to recover an adhesion of said print pattern by said activation ingredient of said ultraviolet hardening resin composite and transferring said print pattern on a surface of an article under water pressure to form a decoration layer on the surface of said article and to form an integral layer having said print pattern and said ultraviolet hardening resin composite coating agent intermingled with said ultraviolet hardening resin composite coating agent permeated into the whole print pattern, said decoration layer formed by said integral layer whereby a chemical and physical surface protection function is imparted to said decoration layer itself by said ultraviolet hardening of said decoration layer, characterized in that said photo-polymerization monomer of said ultraviolet hardening resin composite of said coating agent has 3 or less functional groups and a volume shrinkage coefficient of 20% or less, said coating agent contains resin beads having an average particle diameter of 5 through 50 micrometer and said ultraviolet hardening resin composite and said resin beads are blended at 100 weight part versus 15 to 100 weight part.

12. A coating agent for a water pressure transfer film as set forth in claim 11 and characterized by said photo-polymerization ingredient containing a photo-polymerization oligomer having ten or less functional groups.

13. A coating agent for a water pressure transfer film as set forth in claim 12 and characterized by said photo-polymerization oligomer having a glass transition temperature Tg of 40° C. or less.

14. A coating agent for a water pressure transfer film as set forth in claim 11 and characterized by said resin beads having a glass transition temperature of −50 through 100° C. (measured based on JIS K7121).

15. A coating agent for a water pressure transfer film as set forth in claim 11 and characterized by said resin beads having an end of hydroxyl group (OH group) bonded on the surface and said ultraviolet hardening resin composite containing an ingredient having an isocyanate group.

16. A coating agent for a water pressure transfer film as set forth in claim 11 and characterized by said coating agent further containing a particulate silica having an average particle diameter of 0.005 through 10 micrometers and said particulate silica being blended at a blend ratio of 12.5 to 37.5 weight part relative to 100 weight part of the resin beads.

17. A coating agent for a water pressure transfer film as set forth in claim 11 and characterized by said resin beads being polyurethane beads and having a glass transition temperature of −50 through 50° C. (measured based on JIS K7121).

18. A coating agent for a water pressure transfer film as set forth in claim 11 and characterized by said coating agent further containing a reactive silicone based ingredient.

19. A coating agent for a water pressure transfer film as set forth in claim 11 and characterized by said coating agent further containing a polyol.

20. A coating agent for a water pressure transfer film as set forth in claim 11 and characterized by said coating agent being in the state of two liquid component liquefaction of a first liquid component containing photo-polymerization ingredient (photo-polymerization oligomer and photo-polymerization monomer) and a second liquid component of a non-reactive resin and other ingredient being blended in either of said first and second liquid components.

* * * * *

UNITED STATES PATENT AND TRADEMARK OFFICE
CERTIFICATE OF CORRECTION

PATENT NO.         : 9,068,098 B2
APPLICATION NO.    : 14/113925
DATED              : June 30, 2015
INVENTOR(S)        : Wataru Ikeda It is certified that error appears in the above-identified patent and that said Letters Patent is hereby corrected as shown below:

In the Claims

In Column 36, line 1, being line 1 of claim 6, please delete "as set forth claim 1" and insert therefor -- as set forth in claim 1 --.

Signed and Sealed this
Twenty-seventh Day of October, 2015

Michelle K. Lee
*Director of the United States Patent and Trademark Office*